United States Patent
Kayashima et al.

[19]

[11] Patent Number: 6,133,928
[45] Date of Patent: Oct. 17, 2000

[54] IMAGE RECORDING APPARATUS, IMAGE DATA GENERATING APPARATUS, AND RECORDING METHOD

[75] Inventors: Kazuhiro Kayashima; Hiroshi Akahori, both of Hirakata; Atsushi Morimura; Takeo Azuma, both of Nara; Makoto Fujimoto, Kyoto; Kunio Nobori; Yasuo Fukui, both of Kadoma; Koji Ikeda, Katano; Kenji Iwano, Nara, all of Japan

[73] Assignee: Matsushita Electric Industrial Co., Ltd., Osaka, Japan

[21] Appl. No.: 08/875,832

[22] PCT Filed: Nov. 7, 1996

[86] PCT No.: PCT/JP96/03272

§ 371 Date: Jul. 10, 1997

§ 102(e) Date: Jul. 10, 1997

[87] PCT Pub. No.: WO97/18088

PCT Pub. Date: May 22, 1997

[30] Foreign Application Priority Data

Nov. 10, 1995 [JP] Japan .................................. 7-293095
Apr. 26, 1996 [JP] Japan .................................. 8-106613

[51] Int. Cl.[7] ...................................................... B41J 2/32
[52] U.S. Cl. ........................................... 347/171; 347/218
[58] Field of Search ................................... 347/171, 218, 347/187, 212; 346/139 D

[56] References Cited

U.S. PATENT DOCUMENTS

| | | | |
|---|---|---|---|
| 5,455,689 | 10/1995 | Taylor et al. | 358/450 |
| 5,764,266 | 6/1998 | Azuma et al. | 347/171 |

FOREIGN PATENT DOCUMENTS

| | | |
|---|---|---|
| 3-225481 | 10/1991 | Japan . |
| 4-136836 | 5/1992 | Japan . |
| 5-210181 | 8/1993 | Japan . |
| 6-278318 | 10/1994 | Japan . |
| 6-340099 | 12/1994 | Japan . |
| 3012146 | 4/1995 | Japan . |

OTHER PUBLICATIONS

Japanese language search report.
English translation of PCT/ISA/210.

*Primary Examiner*—Huan Tran
*Attorney, Agent, or Firm*—Ratner & Prestia

[57] ABSTRACT

To prevent a printed image from becoming difficult to view because of displacements in print positions when a plurality of images are printed in separate procedures to produce the printed image, the present invention comprises a lenticular sheet holding member for holding a lenticular sheet thereon, a thermal head for recording an image on a back surface of the lenticular sheet, a driver for moving the lenticular sheet holding member relative to the thermal head, a limiting member for limiting a prescribed face of the lenticular sheet and thereby positioning the lenticular sheet, and a pressing member for pressing the lenticular sheet toward the limiting member.

59 Claims, 26 Drawing Sheets

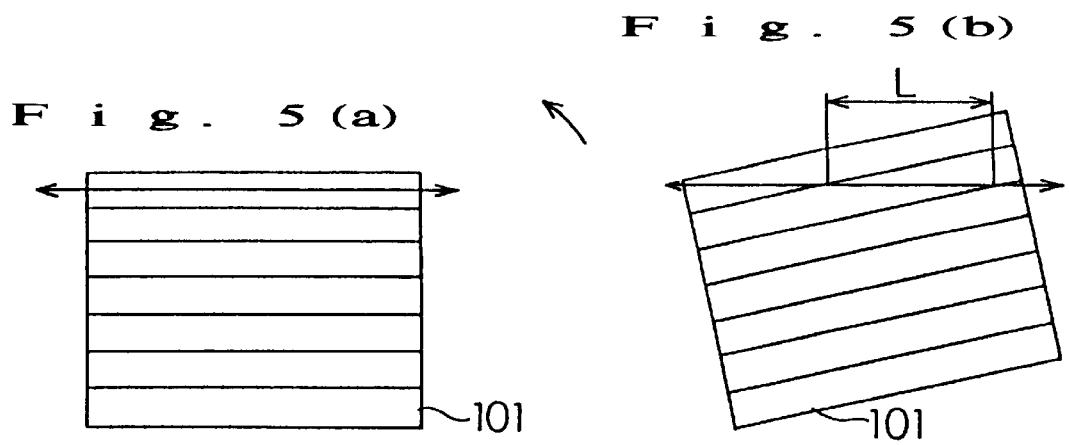
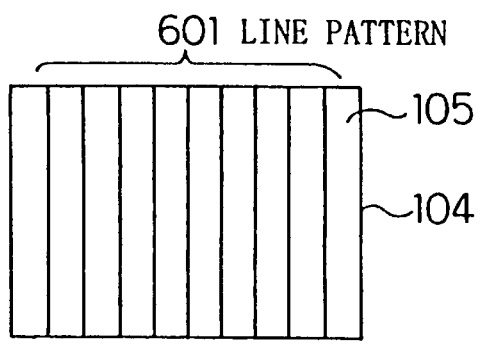
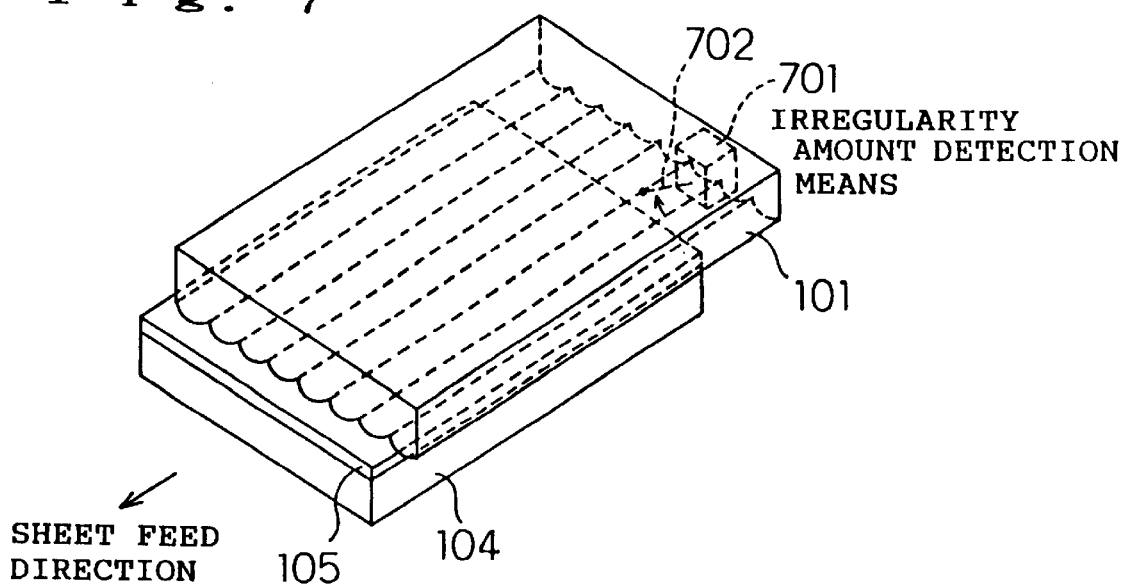

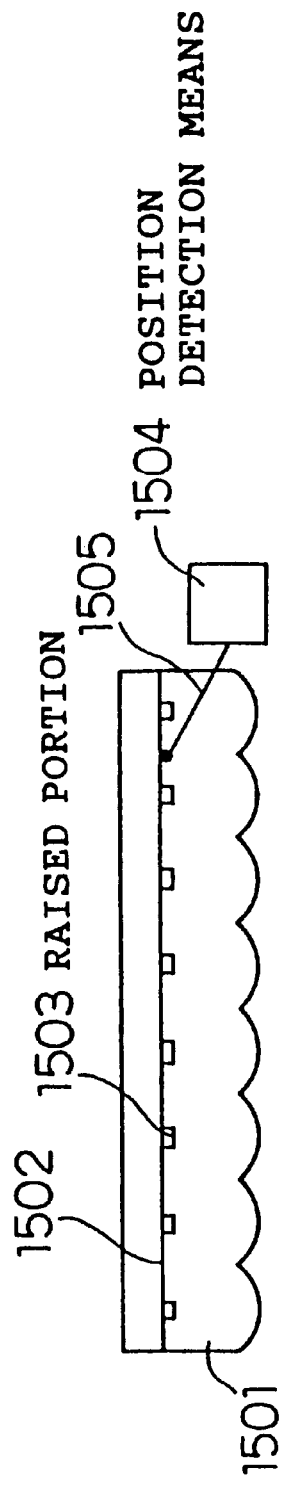
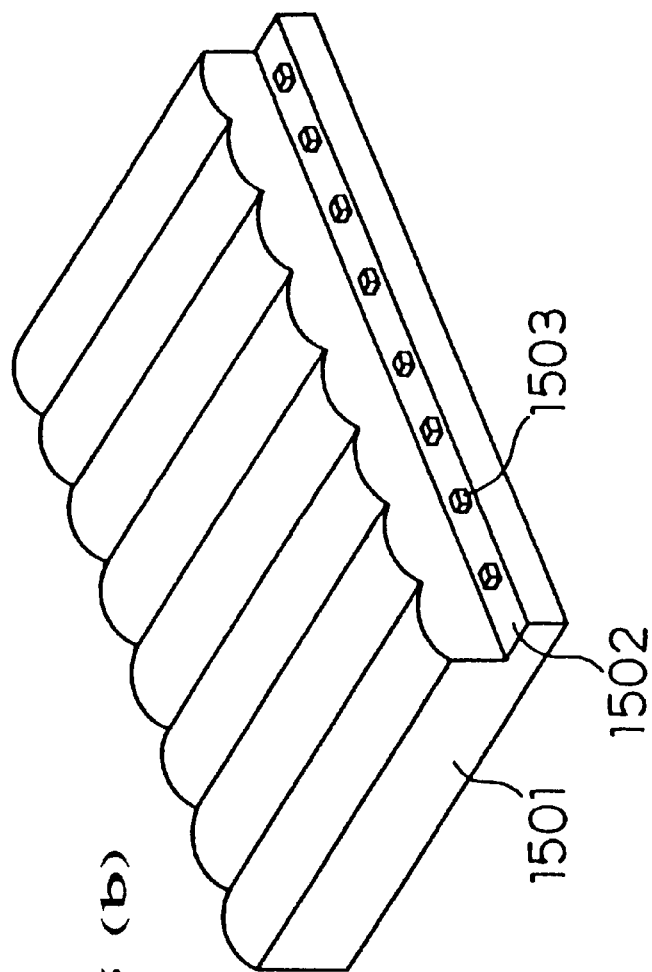

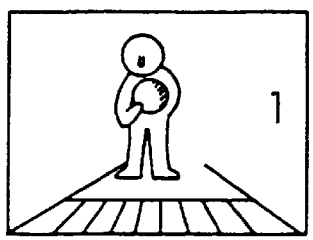 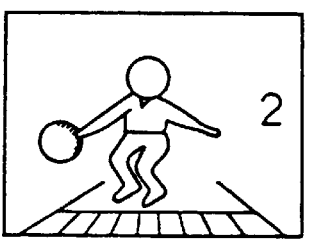 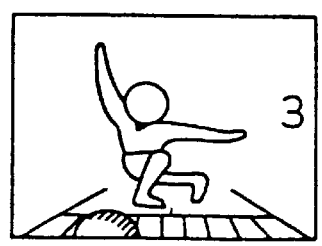
Fig. 33 (a)
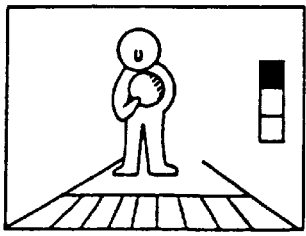 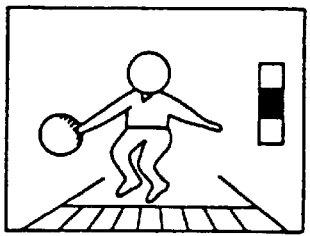 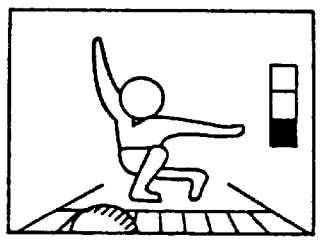
Fig. 33 (b)

IMAGE RECORDING APPARATUS, IMAGE DATA GENERATING APPARATUS, AND RECORDING METHOD

TECHNICAL FIELD

The present invention relates to an image recording apparatus, an image data generating apparatus, and a recording method, which are used for printing a plurality of images, for example, on the back of a lenticular sheet capable of presenting different images when viewed from different directions.

BACKGROUND ART

To achieve stereoscopic viewing of a picture or a photograph, it is known in the art to laminate a lenticular sheet, consisting of a plurality of semicylindrically shaped lenses, onto a picture or photograph so printed as to correspond with the left and right eyes. This is depicted in FIG. 22; that is, when a picture 2002, consisting of left-eye images A1, A2, . . . and right-eye images B1, B2, . . . printed in stripe patterns on a base sheet 2003, is viewed through the lenticular sheet 2001 laminated thereon, the images A1, A2, . . . are shown to the left eye and the images B1, B2, . . . shown to the right eye, thus achieving stereoscopic viewing.

Here, to achieve stereoscopic viewing with good precision, the left-eye images and right-eye images to be printed must be matched to the position of each lens of the lenticular sheet 2001. However, since the lenticular sheet 2001 is usually manufactured by thermoforming a vinyl chloride plate or the like, the width of each lens, the lens pitch, etc. change after the manufacture because of changes in temperature. Also, when printing a picture by a printer or other means, high printing precision is required.

A technique for solving the above problem is proposed, for example, in Japanese Patent Unexamined Publication No. 6-340099. According to this technique, when printing an image composed of stripes, the position of the lenticular sheet is detected by an optical method, and the image is printed based on the position being detected.

With this method, however, if the position of the lenticular sheet is displaced with respect to the print head position, or if the direction of placement is displaced, for example, by one lens pitch with respect to the direction of feeding, the position of the picture printed by the print head does not match the lens position of the lenticular sheet, that is, a registration error occurs between the lens and picture. In particular, if images are to be printed not only to present a picture for stereoscopic viewing but also to provide a sensation of motion using three or more pictures (see FIG. 23), the problem to be overcome is that the position and orientation of the lenticular sheet must be aligned with higher precision.

In view of the above-outlined problems with the prior known printed products such as a lenticular sheet, it is an object of the present invention to provide an image recording apparatus, an image data generating apparatus, and a recording method, which can improve the accuracy of print positions when printing a plurality of images in separate procedures.

DISCLOSURE OF THE INVENTION

To achieve the above object, the present invention provides the following arrangements.

With this arrangement, the lenticular sheet can be accurately positioned and supported.

With this arrangement, the lens pitch of the lenticular sheet can be matched to the desired pitch.

With this arrangement, printing can be performed accurately to match the lens pitch.

With this arrangement, printing matched to the lens pitch can be accomplished by a simple method of temperature detection.

With this arrangement, since the detection of the lenticular sheet position is performed near the recording position of the recording means, the print position can be brought in precise registry.

With this arrangement, the position of the lenticular sheet can be detected accurately.

With this arrangement, a group of images showing most natural motion can be selected, and an easy-to-view moving image can be printed.

With this arrangement, an image that looks changing without unnaturalness can be synthesized.

With this arrangement, the picture on the lens sheet can be viewed more clearly.

With this arrangement, the positioning of the lenticular sheet can be achieved with simple construction.

With this arrangement, an easy-to-view image can be obtained since the image can be seen at the same position, regardless of the angle of viewing, even if the target changes.

An easy-to-view image can be obtained since the image can be seen at the same position, regardless of the angle of viewing, even if the target is transformed.

With this arrangement, the sequence of images can be clearly grasped when editing the images, for example.

BRIEF DESCRIPTION OF THE DRAWINGS

FIGS. 5(a) and 5(b) are diagrams showing an example of angle detection when angular displacement is small according to the second embodiment;

FIG. 6 is a diagram showing an example of using the phenomenon of a moire pattern for angle detection according to the second embodiment;

FIG. 7 is a diagram showing an example of using an irregularity amount detection means for angle detection according to the second embodiment;

FIG. 15(a) is a diagram showing the construction of one example of a position detection means according to the seventh or eighth embodiment, and FIG. 15(b) is a perspective view showing the lenticular sheet used with the position detection means;

FIGS. 33(a) and 33(b) are diagrams showing image display examples according to the 17th embodiment.

(DESCRIPTION OF THE REFERENCE NUMBERS)

101. LENTICULAR SHEET, 102. THERMAL HEAD, 103. INK SHEET, 104. LENTICULAR SHEET HOLDING MEMBER, 106. LIMITING MEMBER, 107. PRESSING MEMBER, 112. DRIVER, 117. FASTENING MEMBER, 120. TRANSPORT MEANS, 301. LIGHT EMITTER, 302. LIGHT RECEPTOR, 303. ROTATING MECHANISM, 701. IRREGULARITY AMOUNT DETECTION MEANS, 1001. PRESSING ROLLER, 1301. LENS PITCH READING MEANS, 1503. RAISED PORTION, 1504. POSITION DETECTION MEANS, 1701. IMAGE DATA GENERATING APPARATUS, 1703. IMAGE DATA FORMAT CONVERTING MEANS, 1704. IMAGE DISPLAY MEANS, 1705. SELECTION INSTRUCTION INPUT MEANS, 1706. IMAGE INPUT MEANS, 1903. INTERVAL SPECIFYING MEANS, 1904. TRANSFORMING/SYNTHESIZING SECTION, 2901. POSITION ALIGNING MEANS, 3202. SEQUENCING INFORMATION APPENDING MEANS

BEST MODE FOR CARRYING OUT THE INVENTION

The present invention will be described below with reference to the drawings illustrating the embodiments thereof.

Figure 1:
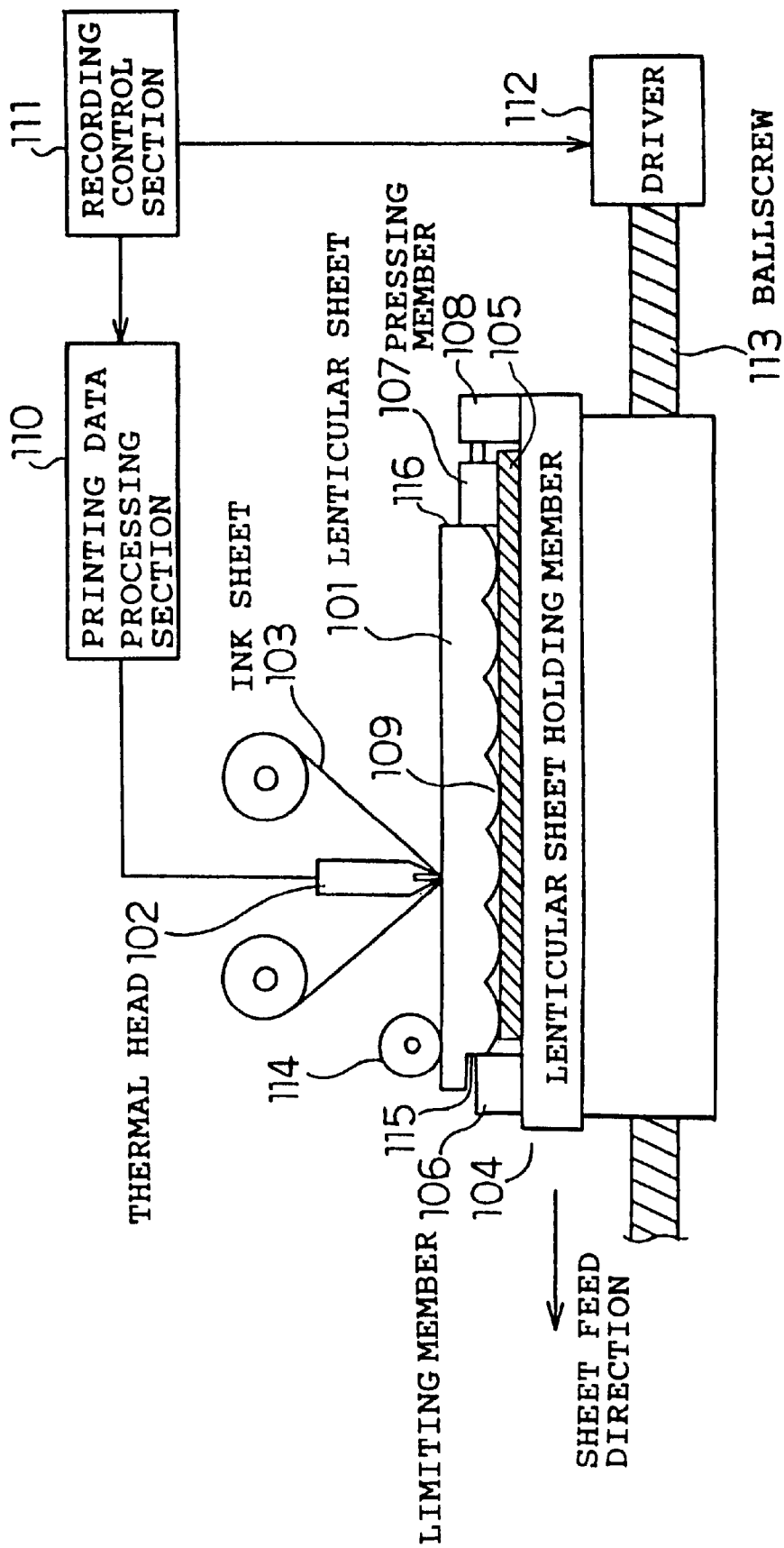
FIG. 1 is a schematic diagram showing the construction of an image recording apparatus according to a first embodiment of the present invention.

FIG. 1 is a schematic diagram showing the construction of an image recording apparatus according to a first embodiment of the present invention. As shown, in the image recording apparatus, there is provided a lenticular sheet holding member 104 as a lenticular sheet supporting member for holding thereon a lenticular sheet 101 on one side of which a plurality of cylindrical lenses 109 (hereinafter simply referred to as the lenses) are formed. There are also provided a ballscrew 113 and a driver 112 for moving the lenticular holding member 104 in the direction shown by an arrow. On the lenticular sheet holding member 104, there are provided a flexible layer 105 for preventing the deformation, etc. of the lenticular sheet 101 mounted thereon, and a limiting member 106 and a pressing member 107 for holding the lenticular sheet 101 precisely in position. Here, the limiting member 106 is rigidly mounted on the lenticular holding member 104. A gap is provided between the flexible layer 105 and the limiting member 106 and pressing member 107 to prevent the flexible layer 105 from being deformed by the pressing action of the pressing member 107. The flexible layer 105 may be formed, for example, from a rubber (such as NBR) having a hardness of 20 to 60E and a thickness of 1 to 5 mm; further, if the surface is formed from a material containing a fluorine polymer, a low-friction surface can be provided over which the lenticular sheet 101 can be moved smoothly by the pressing action of the pressing member 107. The pressing member 107 is urged, for example, by a solenoid 108 or the like.

There are further provided a thermal head 102 for printing an image on the back of the lenticular sheet 101, and an ink sheet 103 coated with a sublimation dye. The thermal head 102 is supplied with image data from a printing data processing section 110. The printing data processing section 110 and the driver 112 are connected to a recording control section 111 which controls the feed timing of the lenticular sheet 101, print data timing, etc. There is also provided a roller 114 which prevents the lenticular sheet 101 from sticking and lifting up together with the thermal head 102 when the latter is lifted up after printing.

Here, the thermal head 102, the ink sheet 103, etc. constitute a recording means; the driver 112, the ballscrew 113, etc. constitute a moving mechanism; and the limiting member 106, the pressing member 107, etc. constitute a positioning mechanism.

Figure 2:
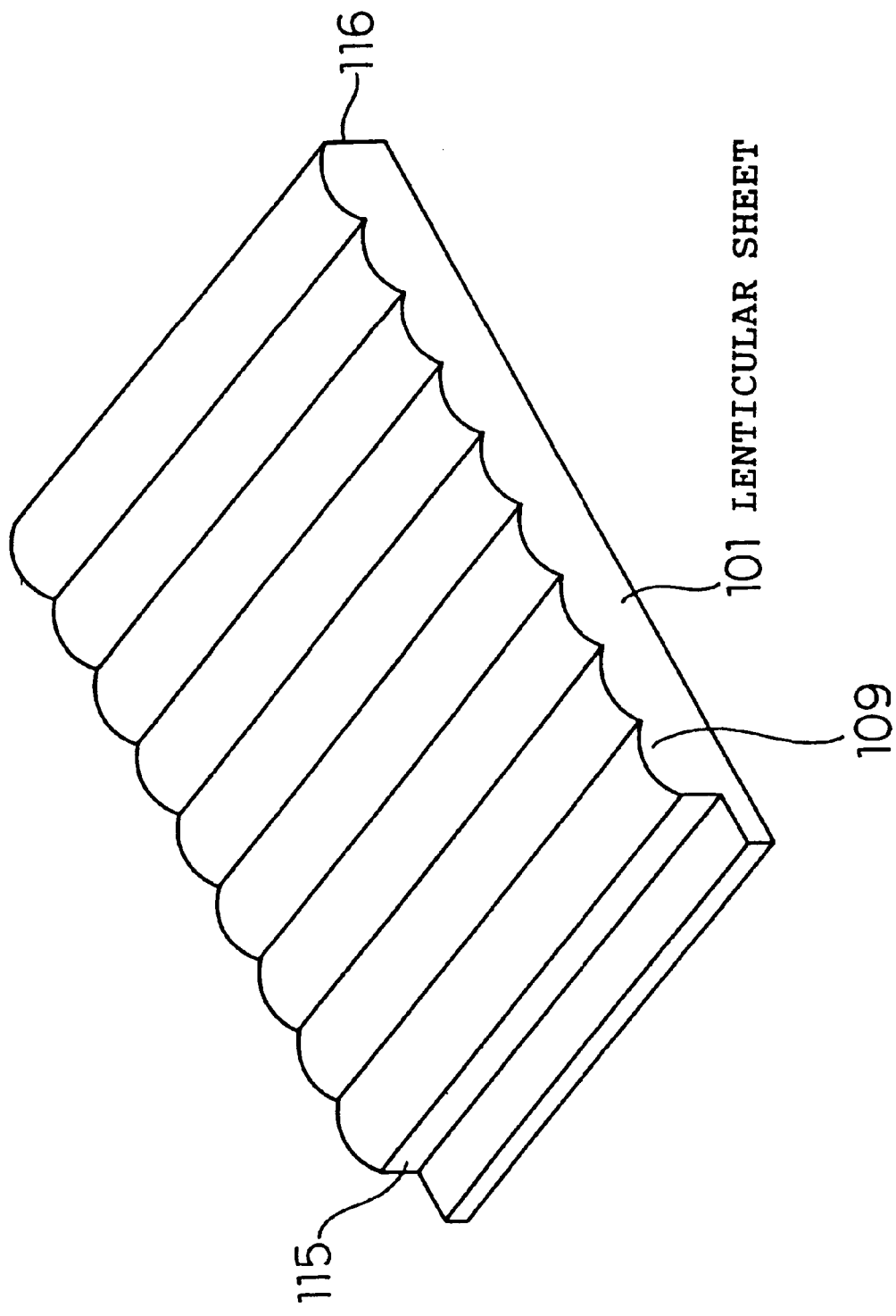
FIG. 2 is a diagram showing one example of a lenticular sheet used in the image recording apparatus of the first embodiment.

FIG. 2 is a diagram showing the lenticular sheet 101 as viewed from the side thereof where the lenses 109 are formed. On one end of the lenticular sheet 101 is formed a face 115 as a prescribed face which abuts against the limiting member 106. By making this face 115 abut against the limiting member 106 and pressing the opposite face 116 by the pressing member 107, the holding position can be determined accurately. Here, the thickness of the lenticular sheet 101, the size and number of the lenses 109, etc. are illustrated in schematic form: in reality, their dimensions are on the order of less than a millimeter. This also applies to the embodiments hereinafter described.

In the present embodiment, the lenticular sheet 101 is mounted on the flexible layer 105 of the lenticular sheet holding member 104 with the face 115 facing the limiting member 106, and the face 116 is pressed by the pressing member 107 to hold the lenticular sheet 101 in a prescribed position with respect to the lenticular sheet holding member 104. Since this prescribed position is predetermined, the subsequent printing operation can be controlled simply and with high precision.

In the above-described first embodiment, the face 115 which is made to abut against the limiting member 106 is formed by notching one end of the lenticular sheet, but alternatively, the face may be formed in a grooved shape; in fact, any shape is possible as long as it has a face that can immobilize the holding position when pressed by the pressing member 107. This face 115 may also be formed by compression molding simultaneously when integrally molding the lenticular sheet.

Furthermore, in the above-described first embodiment, the lenticular sheet is held with the longitudinal direction of its lenses oriented perpendicularly to the direction of feeding; alternatively, the lenticular sheet may be held with the longitudinal direction of its lenses oriented parallel to the direction of feeding.

Figure 24:
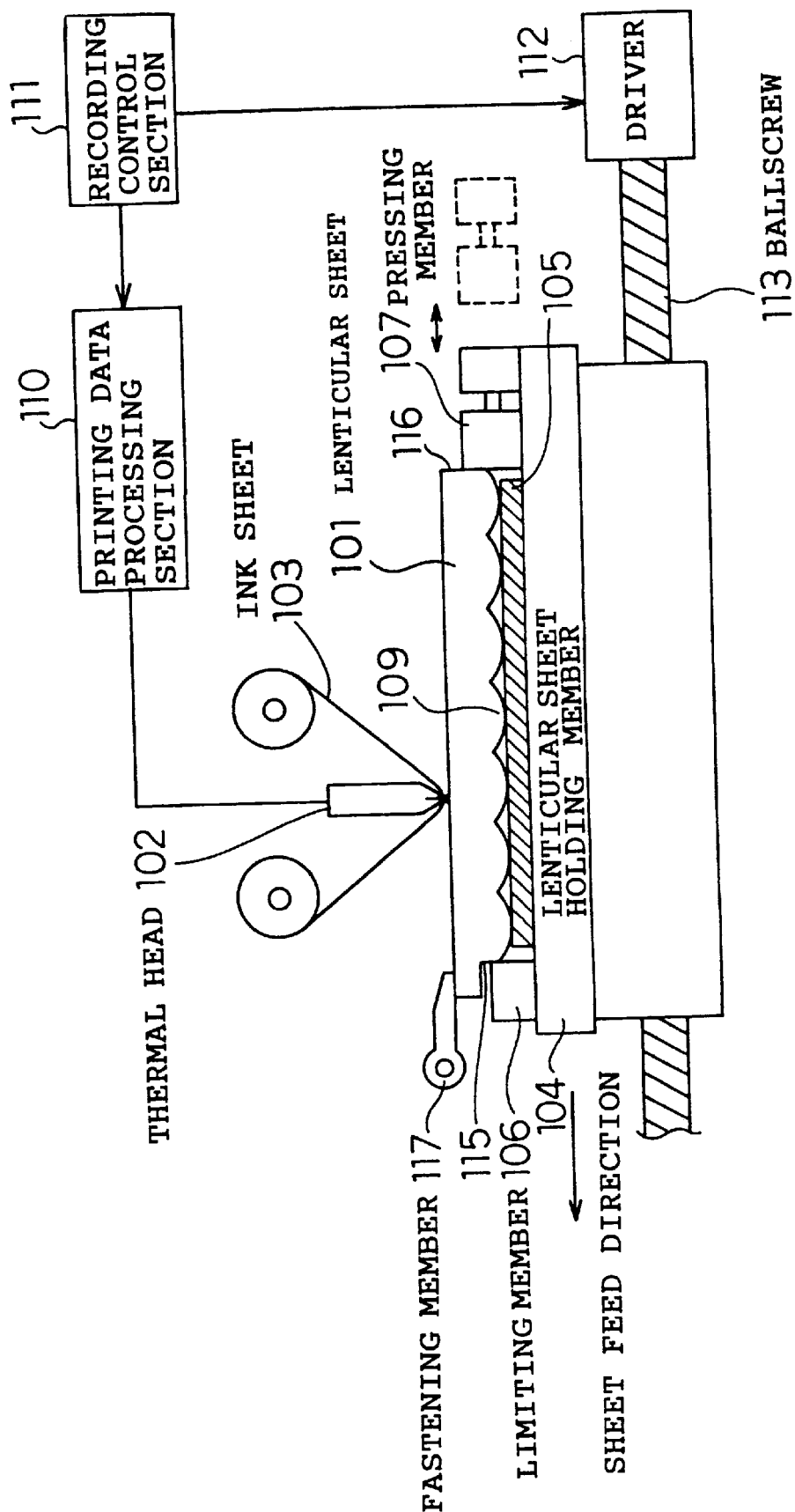
FIG. 24 is a schematic diagram showing the construction of an image recording apparatus according to a 12th embodiment of the present invention.

Moreover, in the above-described first embodiment, the flexible layer 105 is formed extending below the pressing member 107, but instead, the dimension of the flexible layer 105 in the pressing direction may be made smaller than the corresponding dimension of the lenticular sheet 101, for example, as shown in FIG. 24, in which case the pressing member 107 is positioned directly above the lenticular holding member 104.

Figure 3:
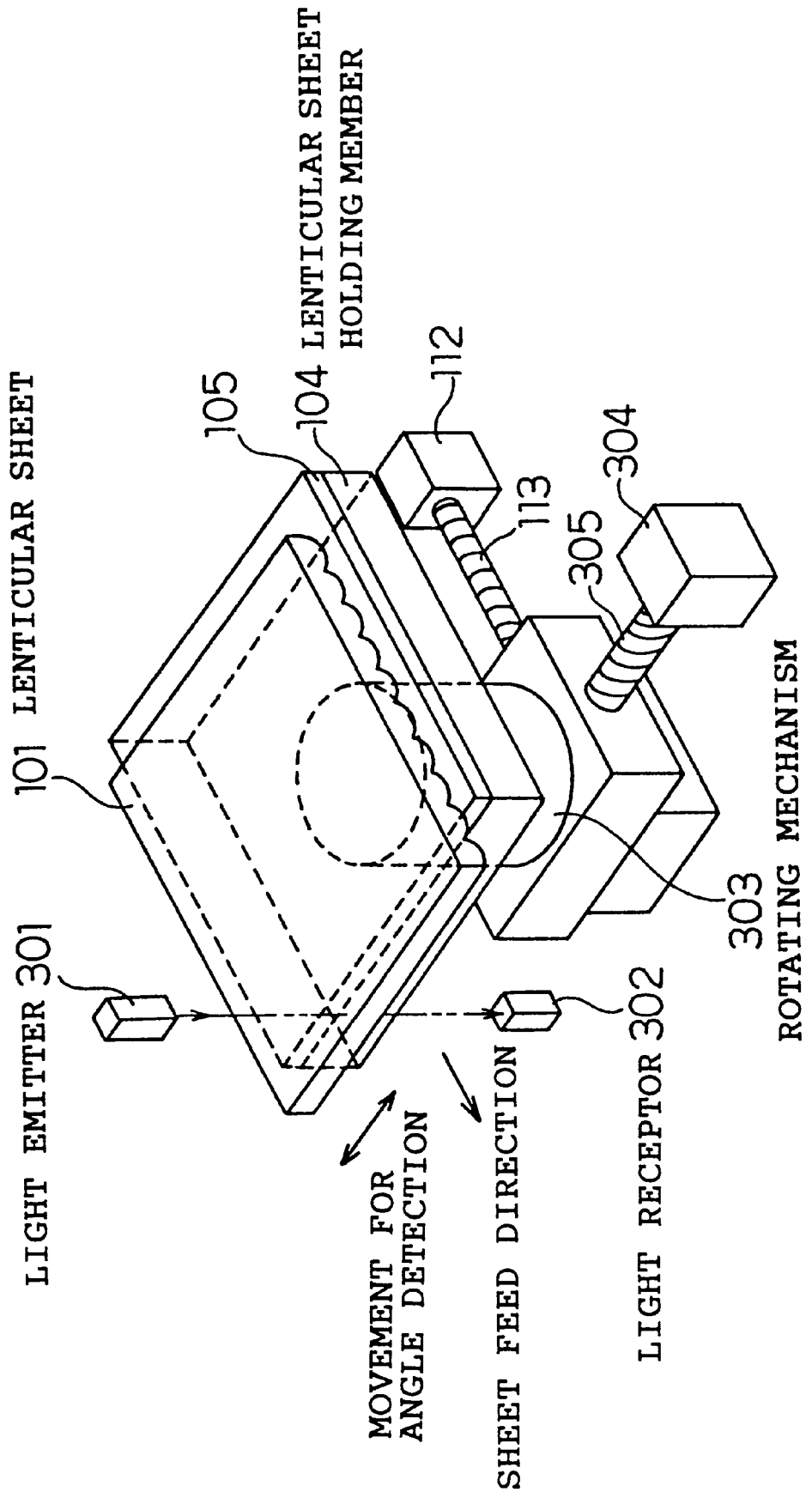
FIG. 3 is a schematic diagram showing the construction of an image recording apparatus according to a second embodiment of the present invention.

FIG. 3 is a schematic diagram showing the construction of an image recording apparatus according to a second embodiment of the present invention. As shown in FIG. 3, a rotating mechanism 303 for rotating the lenticular sheet holding member 104, and a ballscrew 305 and a driver 304 for moving the rotating mechanism 303 and the lenticular sheet holding member 104 mounted thereon in a direction perpendicular to the feed direction of the moving mechanism, are provided between the lenticular sheet holding member 104 and the moving mechanism consisting of the driver 112, ballscrew 113, etc. Further, a light emitter 301 as a light radiating means for radiating light toward the lenticular sheet 101 is disposed above an edge portion of the lenticular sheet holding member 104, while a light receptor 302 as a light receiving means for receiving light from the light emitter 301 is mounted below the edge portion. The light emitter 301 and the light receptor 302 together constitute an angle detection means. In the present embodiment, the angle detection means, the rotating mechanism 303, etc. constitute the positioning mechanism The operation of the image recording apparatus of the present embodiment will be described. First, the lenticular sheet 101 is placed on the flexible layer 105 of the lenticular sheet holding member 104 and held in position with the longitudinal direction of its lenses oriented perpendicularly to the direction of feeding. Then, the driver 304 is driven to rotate the ballscrew 305 to move the lenticular sheet holding member 104 in directions shown by the double-headed arrow in FIG. 3. The lenticular sheet 101 held thereon moves accordingly. While this is happening, light is radiated from the light emitter 301, and the light transmitted through the lenticular sheet 101 is received by the light receptor 302. Here, by detecting the changing light along with the amount of movement of the lenticular sheet 101, the angle can be determined that the longitudinal direction of the lenses of the lenticular sheet 101 makes with the direction perpendicular to the direction of feeding by the moving mechanism. That is, since the value of detection by the light receptor 302 changes periodically as the light crosses between adjacent lenses, if the lens pitch and the amount of movement when one period of change is detected are known, the above-mentioned angle can be detected.

Next, based on the thus detected angle, the rotating mechanism 303 is controlled to rotate the lenticular sheet holding member 104 and orient the longitudinal direction of the lenses of the lenticular sheet 101 in a direction perpendicular to the direction of feeding by the moving mechanism. When the orientation of the lenticular sheet 101 is thus corrected, the driver 304 moves the lenticular sheet holding member 104 back to its initial position, thus completing the positioning operation for the lenticular sheet 101. Thereafter, printing is performed while feeding the lenticular sheet 101 by rotating the ballscrew 113 by the driver 112.

Figure 4A:
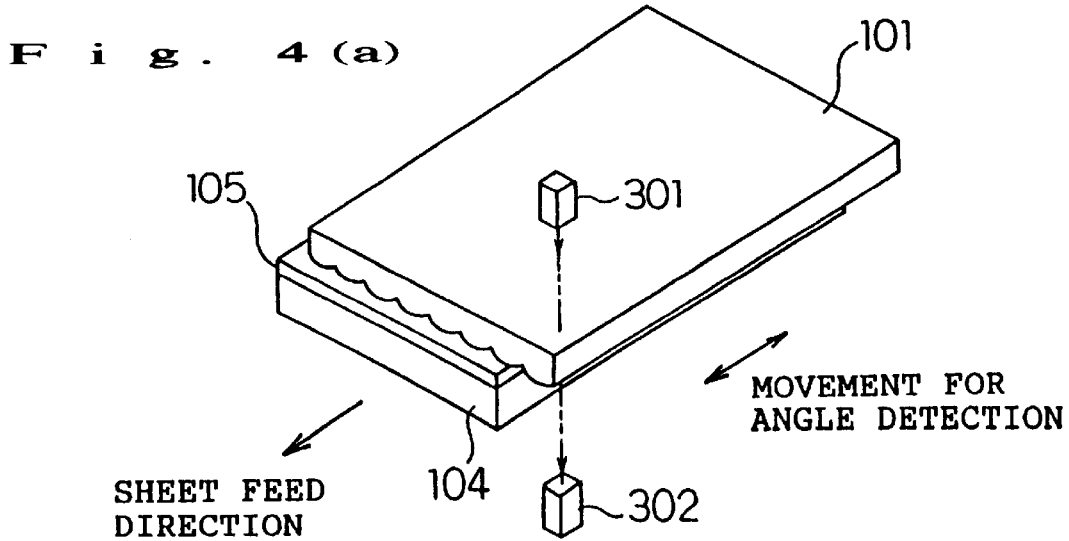
FIG. 4(a) is a diagram showing another example of angle detection according to the second embodiment.

In the above-described second embodiment, the lenticular sheet 101 is set so that the longitudinal direction of its lenses is oriented perpendicularly to the direction of feeding; alternatively, it may be set so that the longitudinal direction of its lenses is oriented parallel to the direction of feeding, as shown in FIG. 4(a). In the latter case, since the direction of movement for angle detection is the same as the direction of feeding, the movement by the driver 304 is not necessary. In this way, when the lenticular sheet 101 is to be held with the longitudinal direction of its lenses always oriented parallel to the direction of feeding, the moving mechanism for providing the movement perpendicular to the movement by the first moving mechanism can be omitted.

Figure 4B:
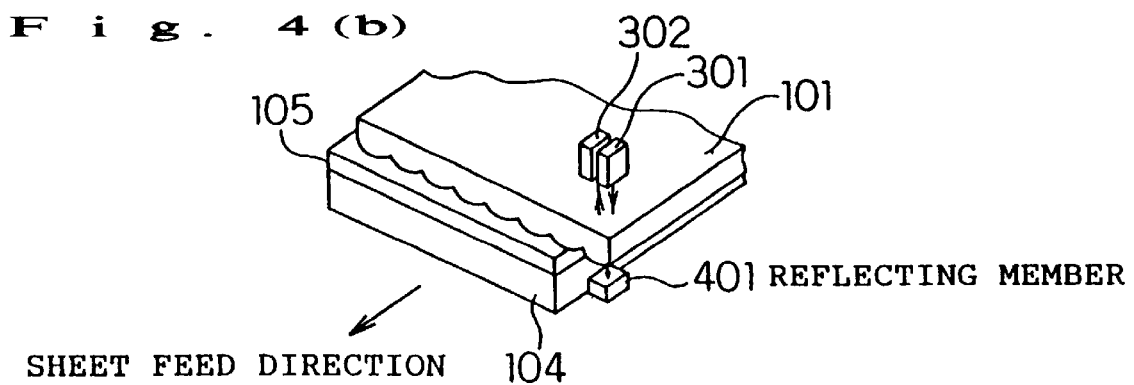
FIG. 4(b) is a diagram showing an example of angle detection using a reflecting member according to the second embodiment.

Furthermore, in the above-described second embodiment, the light emitter 301 and the light receptor 302 are disposed opposite each other across the lenticular sheet 101, but alternatively, the light emitter 301 and the light receptor 302 may be disposed on the same side of the lenticular sheet 101, for example, as shown in FIG. 4(b), in which case a reflecting member 401 is provided on the opposite side of the lenticular sheet 101.

In the above-described second embodiment, if the angular displacement of the lenticular sheet 101 is small, as shown in FIG. 5(a), a situation can occur where the angular displacement cannot be detected even if the lenticular sheet 101 is moved from one end to the other end, because the sufficient change in the detection output cannot be obtained. In that case, if provisions are made to perform the angle detection operation after rotating the lenticular sheet 101 through more than a certain angle by means of the rotating mechanism, as shown in FIG. 5(*b*), a change occurring when crossing between lenses is reflected in the light detection value, so that the angle needed for rotation can be accurately determined based on the amount of movement L.

Further, as the angle detection means, instead of providing the light emitter 301, light receptor 302, rotating mechanism 303, etc., a means for detecting a moire pattern occurring when the lenticular sheet 101 is mounted may be provided by forming a line pattern 601, such as shown in FIG. 6, on the surface of the flexible layer 105 of the lenticular sheet holding member 104 (the surface on which the lenticular sheet 101 is mounted). If there is an angular displacement between the line pattern and the lens direction, a moire pattern occurs; therefore, by observing this using an image sensor or camera, the angle can be detected.

Furthermore, as the angle detection means, an irregularity amount detection means 702 having a probe 701, such as shown in FIG. 7, may be used instead of the light emitter 301, light receptor 302, rotating mechanism 303, etc. In that case, the tip of the probe 702, which is urged by a constant force in the upward direction as shown by the arrow, is made to contact the groove between lenses of the lenticular sheet 101, and the movement of the probe 702 when the lenticular sheet 101 is moved is detected. As the lenticular sheet 101 is moved, the tip of the probe 702, like a phonograph stylus, always moves along the same groove between lenses that the probe was first made to contact; therefore, if the orientation of the lenticular sheet 101 is displaced from the direction of feeding by the moving mechanism, the tip of the probe 702 moves in a plane parallel to the plane of the lenticular sheet 101, so that by detecting this motion by the irregularity amount detection means 701, the angular displacement can be detected. If provisions are made to detect the motion of the probe 702 in vertical directions (directions perpendicular to the above-noted plane), the angular displacement can also be detected as in the above case.

Figure 8:
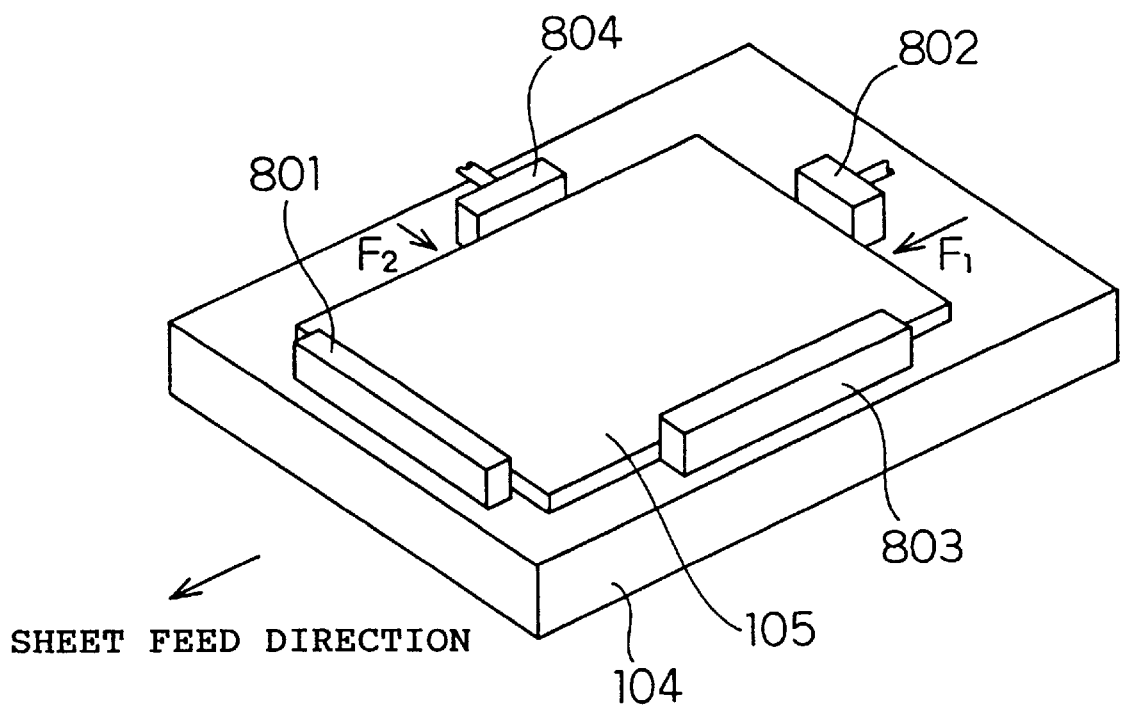
FIG. 8 is a schematic diagram showing the construction of a lenticular sheet in an image recording apparatus according to a third embodiment of the present invention.

FIG. 8 is a schematic diagram showing the construction of a lenticular sheet in an image recording apparatus according to a third embodiment of the present invention. In the first embodiment illustrated in FIG. 1, one set of positioning members, i.e., the limiting member 106 and the pressing member 107, has been provided for positioning the lenticular sheet 101; on the other hand, in the present embodiment, two sets of limiting members 801, 803 and pressing members 802, 804 are arranged at right angles with each other. Otherwise, the basic construction is the same as that shown in FIG. 1. That is, in the present embodiment, the pressing member 802 exerting a pressing force F1 against the limiting member 801 works for positioning in the same direction as the direction of feeding by the moving mechanism, and the pressing member 804 exerting a pressing force F2 against the limiting member 802 works for positioning in the direction perpendicular to the direction of feeding. In this way, precise positioning can be achieved both in the same direction as the direction of feeding by the moving mechanism and in the direction perpendicular to the direction of feeding.

Figure 9A:
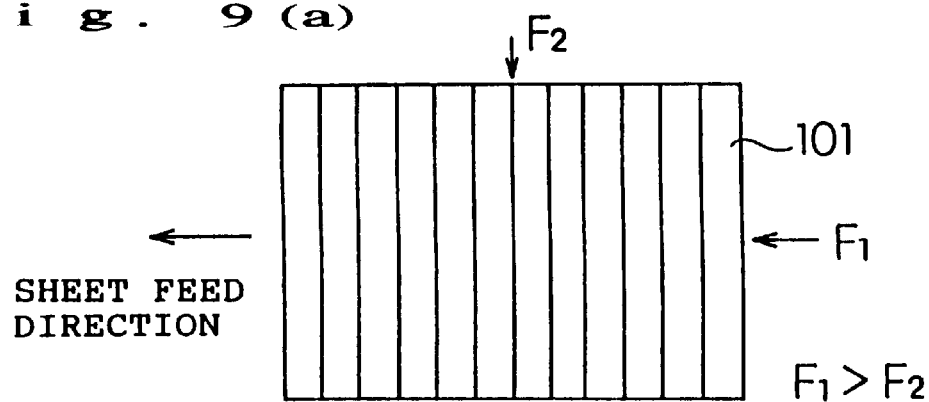
FIGS. 9(a) and 9(b) are diagrams showing the relationship of pressing force with different orientations of the lenticular sheet according to the third embodiment.
Figure 9B:
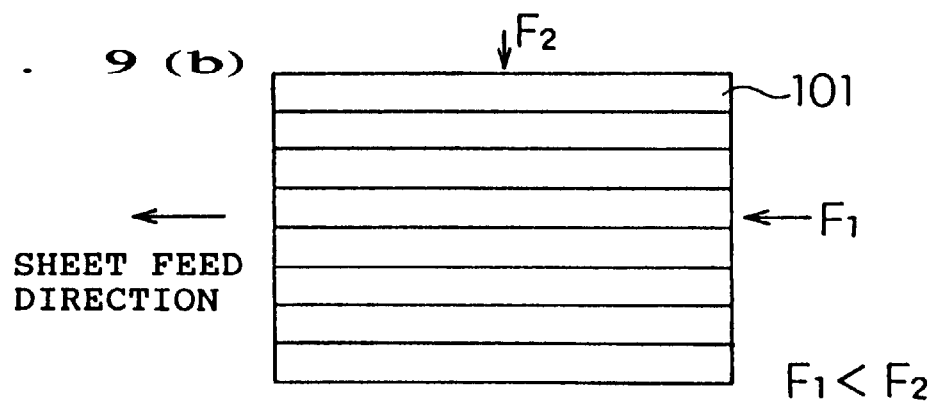

Here, when the longitudinal direction of the lenses of the lenticular sheet 101 is perpendicular to the direction of feeding by the moving mechanism, as shown in FIG. 9(*a*), the pressing force F1 is set larger than the pressing force F2, since any positional displacement with respect to the direction of feeding must be eliminated. In this case, F2 may be set to 0; that is, after first pressing with the pressing force F2, F2 is set to 0. On the other hand, when the longitudinal direction of the lenses of the lenticular sheet 101 is parallel to the direction of feeding by the moving mechanism, as shown in FIG. 9(*b*), the pressing force F2 is set larger than the pressing force F1, since any positional displacement with respect to the direction perpendicular to the direction of feeding must be eliminated. In practice, since making the adjustment to increase or decrease the pressing forces F1 and F2 requires a complex mechanism, F2 is set larger than F1 in advance, and when F1>F2 in FIG. 9(*a*), F2 is set to 0 after pressing with F2. In this way, the above purpose can be accomplished easily.

Figure 10:
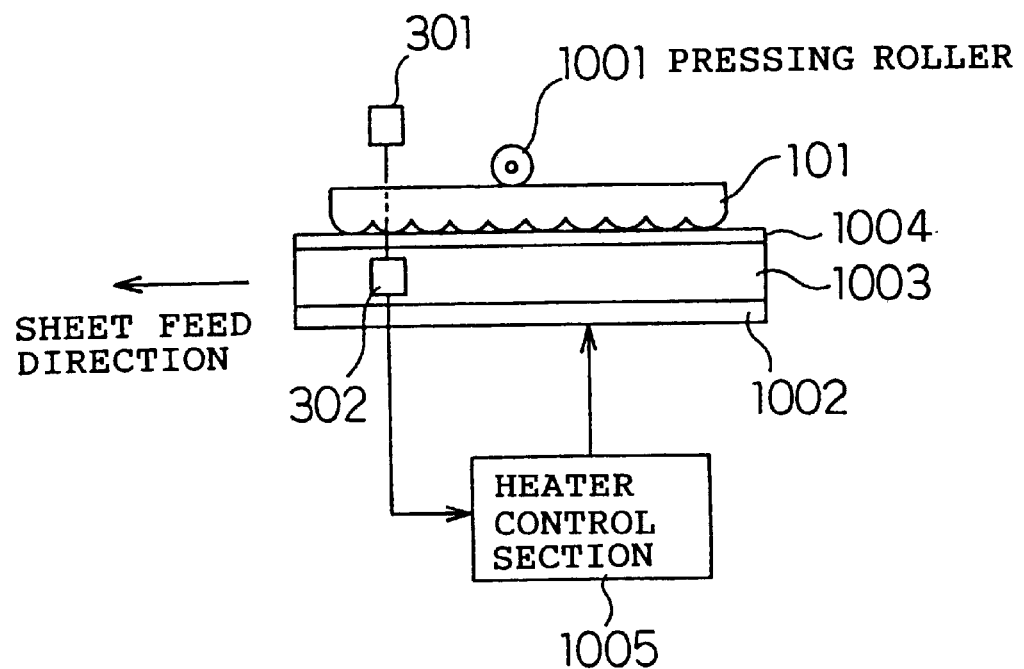
FIG. 10 is a schematic diagram showing the construction of an image recording apparatus according to a fourth embodiment of the present invention.

FIG. 10 is a schematic diagram showing the construction of an image recording apparatus according to a fourth embodiment of the present invention. In the present embodiment, a sheet-like heater 1002 as a heating means is mounted on the back of the lenticular sheet holding member 1003, and a pressing roller 1001 is provided for pressing the lenticular sheet 101 onto the flexible layer 1004 of the lenticular sheet holding member 1003. Further, the light emitter 301 and light receptor 302 are provided as a lens pitch reading means for reading the lens pitch of the lenticular sheet 101. There is also provided a heater control section 1005 for controlling the heating power of the heater 1002 in accordance with the lens pitch read by the lens pitch reading means. The moving mechanism for the lenticular sheet holding member 1003, and other means such as recording means, are fundamentally the same as the foregoing embodiments, and therefore, are not shown here.

As described in connection with the background art, since the lenticular sheet is manufactured by thermoforming vinyl chloride, variations occur in lens pitch, etc. This causes a displacement relative to the heating element pitch of the thermal head. Further, if the feed pitch by the moving mechanism is made constant, a displacement relative to the lens pitch also occurs. In the present invention, to obtain the desired lens pitch, the heating of the lenticular sheet 101 is controlled by feeding back the value of the lens pitch read by the light emitter 301 and light receptor 302. Furthermore, using the pressing roller 1001, the lenticular sheet 101 is pressed from the back thereof onto the flexible layer 1004 so that the heating can be applied uniformly throughout it.

In the above-described fourth embodiment, the light emitter 301 and light receptor 302 are used as the pitch reading means, but instead, other means or methods such as a contact type may be used as long as such means or methods can read the lens pitch.

The fourth embodiment has also been described as holding the lenticular sheet 101 with the longitudinal direction of its lenses oriented perpendicularly to the direction of feeding; alternatively, it may be held so that the longitudinal direction of its lenses is oriented parallel to the direction of feeding. In that latter case, the lens pitch reading means should be oriented to match that direction.

Furthermore, the fourth embodiment has been described as providing the construction such that the degree of heating is controlled by reading the lens pitch, but if the relationship between the lens pitch and temperature is predetermined within acceptable limits, provisions may be made to keep the lenticular sheet holding member 1003 at a predetermined desired temperature, without using the lens pitch reading means and the heater control section 1005.

In the above-described fourth embodiment, to control the heating of the lenticular sheet, the lens pitch is read and the degree of heating is controlled in accordance with the lens pitch; alternatively, the overall length of the lenticular sheet may be read instead of reading the lens pitch, and the degree of heating may be controlled based on the thus read overall length.

Figure 11:
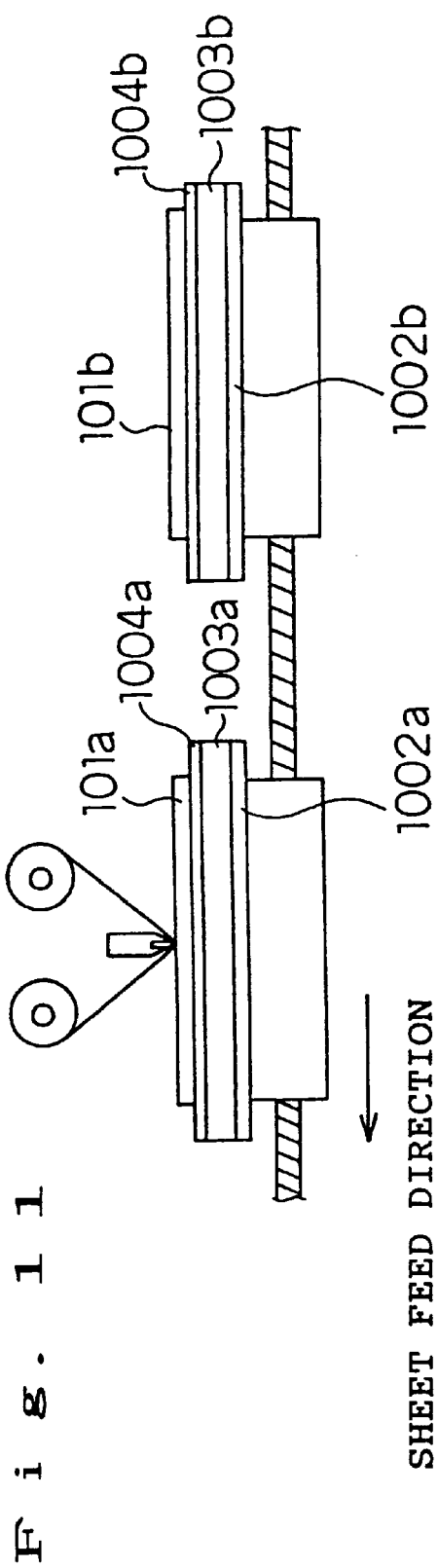
FIG. 11 is a schematic diagram showing the construction of an image recording apparatus according to a fifth embodiment of the present invention.

FIG. 11 is a schematic diagram showing the construction of an image recording apparatus according to a fifth embodiment of the present invention. The present embodiment differs from the foregoing fourth embodiment in that two lenticular sheet holding members 1003a and 1003b having heaters 1002a and 1002b, respectively, are provided. This construction serves to prevent the time required to heat the lenticular sheet 101 (more than one minute), that is, the waiting time, from increasing. More specifically, while printing on the lenticular sheet 101a held on the flexible layer 1004a of the lenticular sheet holding member 1003a, the lenticular sheet 101b held on the flexible layer 1004b of the lenticular sheet holding member 1003b is heated; in this way, the waiting time can be reduced when the printing of the lenticular sheet 101a is completed and printing is next performed on the lenticular sheet 101b.

Figure 12:
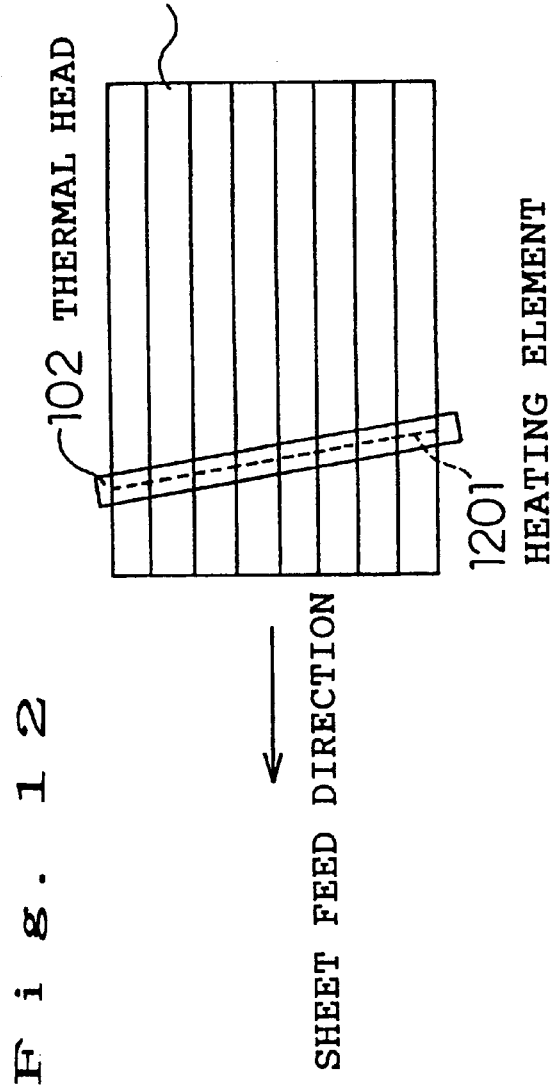
FIG. 12 is a schematic diagram showing the construction of an image recording apparatus according to a sixth embodiment of the present invention.

FIG. 12 is a schematic diagram showing the construction of an image recording apparatus according to a sixth embodiment of the present invention. In the present embodiment, a thermal head tilting mechanism is provided that allows the thermal head 102 to be mounted at an angle relative to the direction perpendicular to the direction of feeding by the moving mechanism. In this way, the pitch of heating elements 1201 can be made variable relative to the lens pitch of the lenticular sheet 101, as shown in FIG. 12, allowing for correction when the heating element pitch of the thermal head 102 is greater than the lens pitch divided by N (N is an integer equal to or larger than 2).

Figure 13:
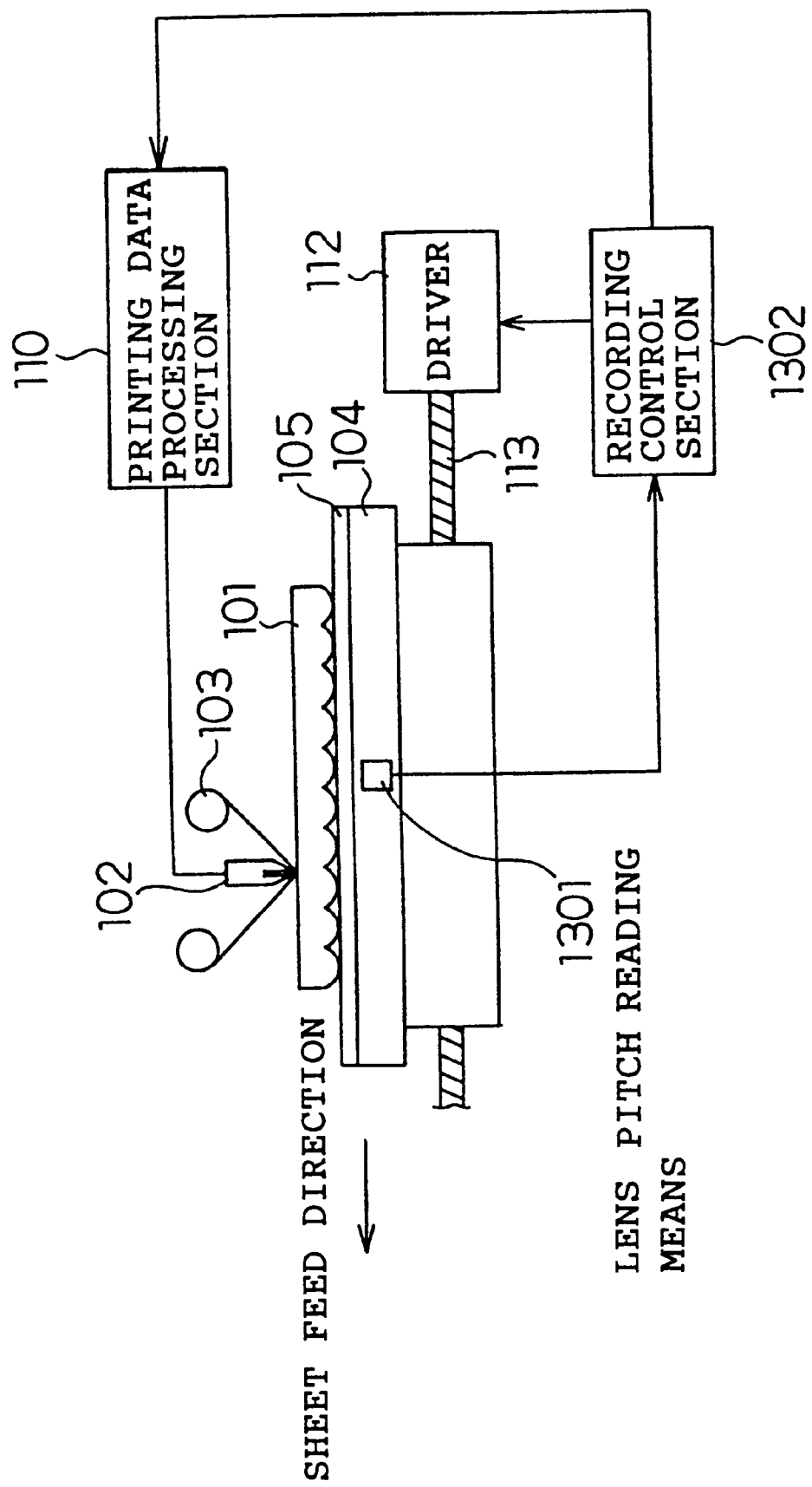
FIG. 13 is a schematic diagram showing the construction of an image recording apparatus according to a seventh embodiment of the present invention.

FIG. 13 is a schematic diagram showing the construction of an image recording apparatus according to a seventh embodiment of the present invention. In this embodiment, first the lenticular sheet holding member 104 is moved by driving the ballscrew 113 by the driver 112, and the lens pitch of the lenticular sheet 101 is read by a lens pitch reading means 1301.

As the lens pitch reading means 1301, the optical type previously shown in FIG. 10 may be used, or as shown in FIG. 15(a), a position detection means 1504 may be used in combination with raised portions 1503 formed along an edge portion of the lenticular sheet 1501. In the latter case, as shown in FIG. 15(b), the raised portions are formed at a pitch equal to an integral submultiple of the lens pitch (1 in the case of the illustrated example), on a notch portion 1502 cut along an edge of the lenticular sheet 1501. As shown in FIG. 15(a), the tip of a probe 1505 attached to the position detection means 1504 is made to contact the notch portion 1502, and by moving the lenticular sheet 1501 in this condition, the lens pitch or position can be detected.

Figures 16A, 16B:
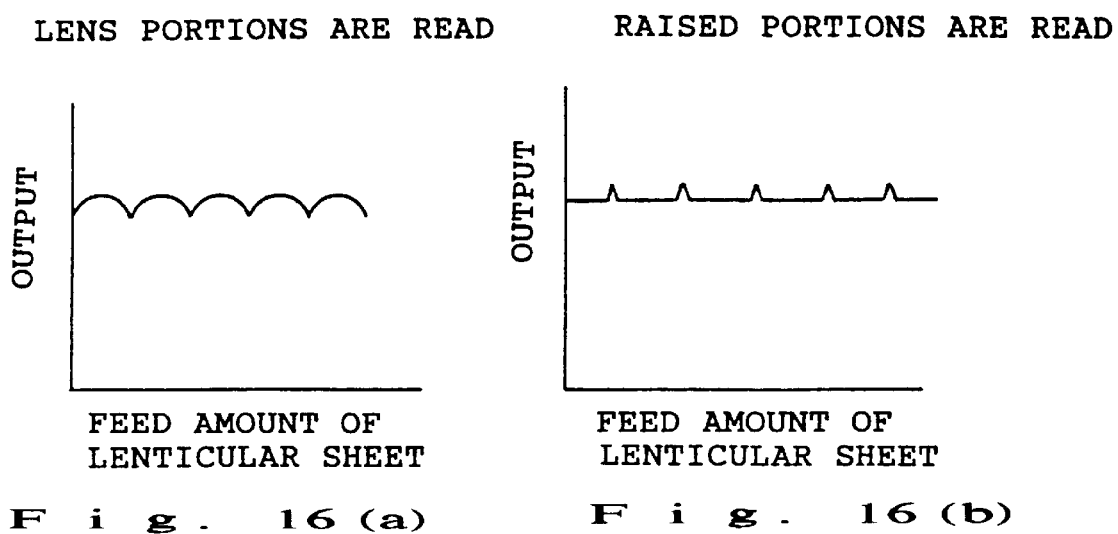
FIG. 16(a) is a diagram showing a detection output when lens portions are read by a position detection means.
FIG. 16(b) is a diagram showing the output of the position detection means of FIG. 15.

When the lens portions are read by an optical method or the like, a detection output such as shown in FIG. 16(a) is obtained; by contrast, with the above-described method, a sharp pulse-like output is obtained, as shown in FIG. 16(b), so that the output may be used not only for lens pitch reading but also for position detection, and the accuracy of position detection can then be increased.

After the lens pitch of the lenticular sheet 101 is read, the recording control section 1032, using the thus read lens pitch, issues a command to the driver 112 and printing data processing section 110 to perform the printing operation. In this way, recording can be made on the desire position on the lenticular sheet 101.

In the above-described seventh embodiment, the recording operation is performed by directly reading the lens pitch; alternatively, a temperature detection means for detecting the temperature of the lenticular sheet 101 may be provided in place of the lens pitch reading means, and the recording operation may be performed by estimating the lens pitch from the temperature of the lenticular sheet 101 and by using the estimated lens pitch. In that case, the temperature detection means may be of contact type or noncontact type, and the temperature of the lenticular sheet 101 need not necessarily be detected directly. If the lens pitch can be estimated from the room temperature, or the temperature within the apparatus, or the temperature of the lenticular sheet holding member 104, for example, provisions may be made to detect the temperature of some other portion.

Figure 14A:
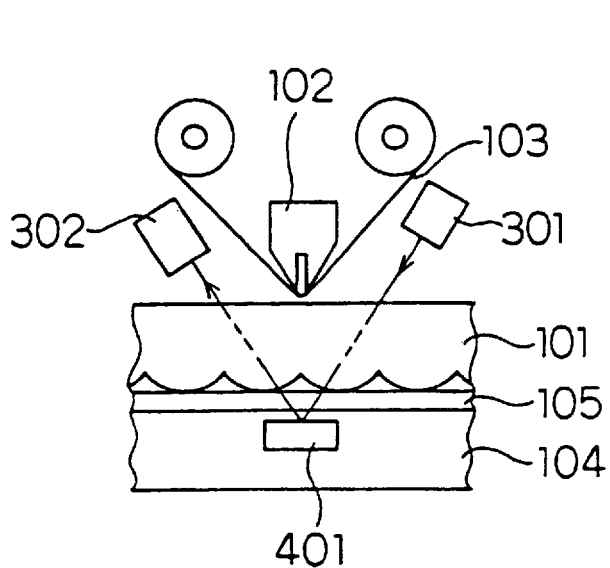
FIG. 14(a) is a schematic diagram showing the construction of a portion near a thermal head in an image recording apparatus according to an eighth embodiment of the present invention.

FIG. 14(a) is a schematic diagram showing the construction of a portion near the thermal head in an image recording apparatus according to an eighth embodiment of the present invention. The present embodiment differs from the foregoing seventh embodiment in that, in the present embodiment, while reading a lens position on the lenticular sheet 101 by the position detection means consisting of the light emitter 301 and light receptor 302, an image printing operation is performed based on the thus read position, whereas in the seventh embodiment, a printing operation is performed after reading the lens pitch first. The present embodiment is therefore configured so that the lens position is detected as close as possible to the thermal head 102 by using a reflecting member 401.

Further, in the present embodiment, when performing two or three or more printing operations on the same lenticular sheet in color printing, misregistration of colors can be reduced by employing the construction such that the second and later printing operations are performed by using the lens position detected in the first printing operation.

Figure 14B:
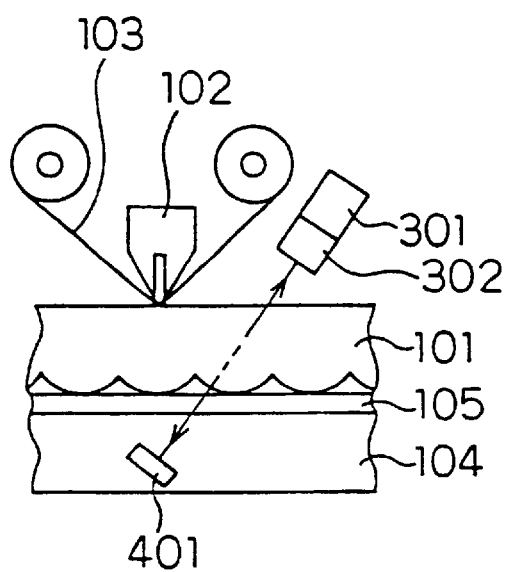
FIG. 14(b) is a diagram showing an alternative configuration of a position detection means in the eighth embodiment.

An alternative configuration of the position detection means is shown in FIG. 14(b), in which the reflecting member 401 is mounted at such an angle as to reflect the light radiated from the light emitter 301 back into the same direction it was radiated, and the light receptor is mounted in the position to which the light is reflected back.

Furthermore, the position detection means may be implemented using the previously described contact method shown in FIG. 15.

In any of the above-described embodiments, the moving mechanism is constructed using a driver and a ballscrew, but this is not an essential requirement; for example, a linear motor system or other method may be used.

Furthermore, in any of the above-described embodiments, a thermal head and a sublimation dye ink sheet are used as the recording means, but this is not an essential requirement; for example, thermal transfer, inkjet, or other printing method may be used.

Any of the above-described embodiments has been constructed to move the lenticular sheet with respect to the recording means; however, the only requirement is that either the recording means or the lenticular sheet be moved relative to the other, and it is of course possible to employ the construction such that the recording means is moved with respect to the lenticular sheet.

Further, in any of the above-described embodiment, the lenticular sheet has been described as a flat sheet; alternatively, the lenticular sheet holding member may be constructed as a rotating drum, and an arc-shaped curved lenticular sheet may be used.

Figure 17:
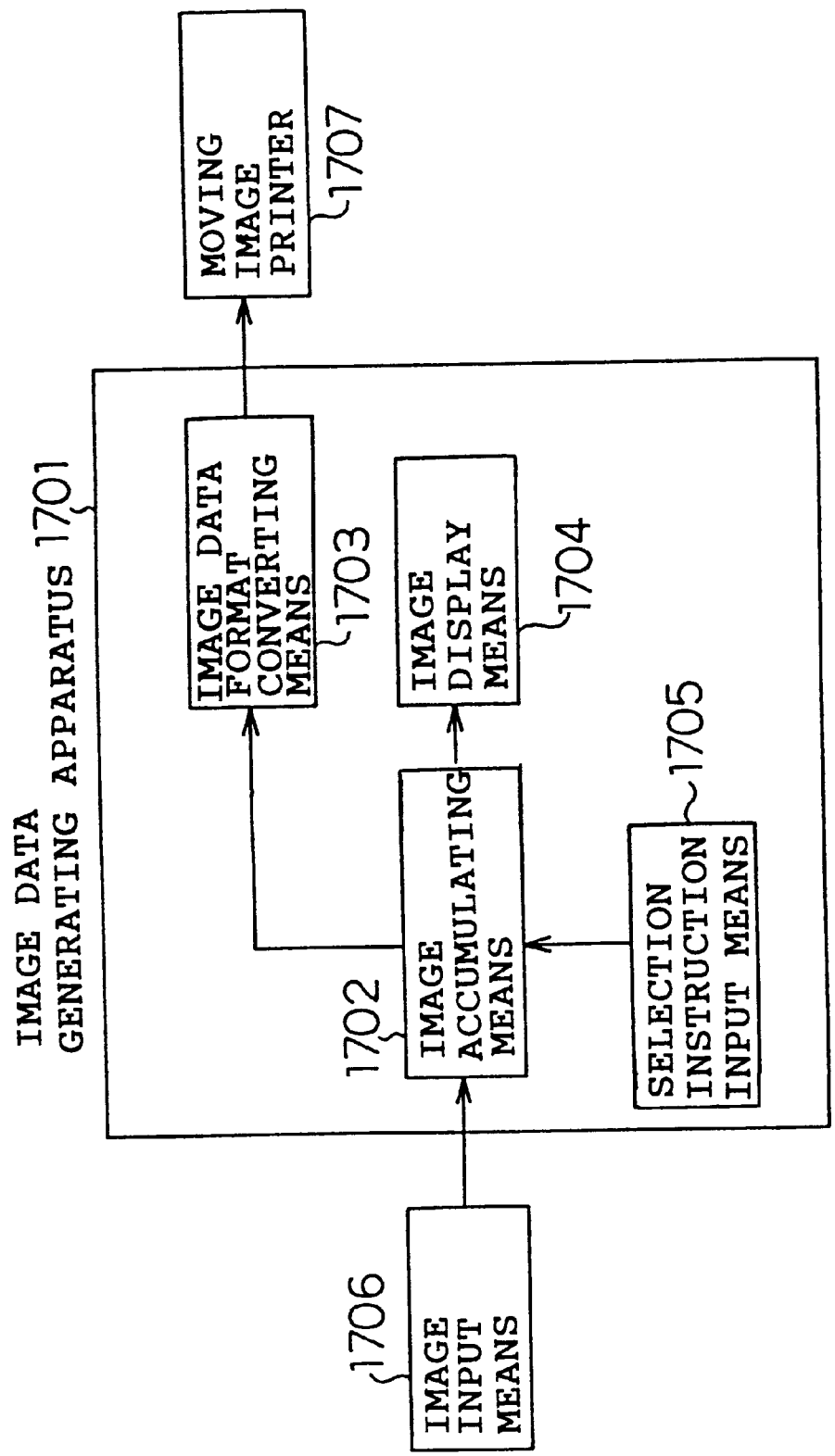
FIG. 17 is a diagram showing the configuration of an image data generating apparatus according to a ninth embodiment of the present invention.

FIG. 17 is a diagram showing the configuration of an image data generating apparatus according to a ninth embodiment of the present invention. The image data generating apparatus 1701 comprises: an image accumulating means 1702 for accumulating a plurality of images input from an image input means 1706 such as a camera, and for aligning the positions of the images; a selection instruction input means 1705 for selecting a predetermined number of images from the plurality of accumulated images, or determining the selected images; an image display means 1704 for producing a multi-display by demagnifying the plurality of images accumulated in the image accumulating means 1702, or displaying the selected images in time division fashion; and an image data format converting means 1703 for converting the images determined by the selection instruction input means 1705 into data, and for outputting the data to a moving image printer 1707. The selection instruction input means 1705 includes a selection instructing means and an image determining means. In the illustrated example, the multi-display means is included in the image display means 1704, but the multi-display means may be provided separately.

Next, the operation of the image data generating apparatus of the ninth embodiment will be described with reference to relevant drawings.

First, a plurality of images, for example, 16 images, are input from the image input means 1706 and accumulated in the image accumulating means 1702. The accumulated 16 images are demagnified and presented for a multi-display on the image display means 1704. While viewing this multi-display screen 1801, the user selects suitable images, six images in the illustrated example, from among the 16 images 1802 by using the selection instruction input means 1705.

Figure 18A:
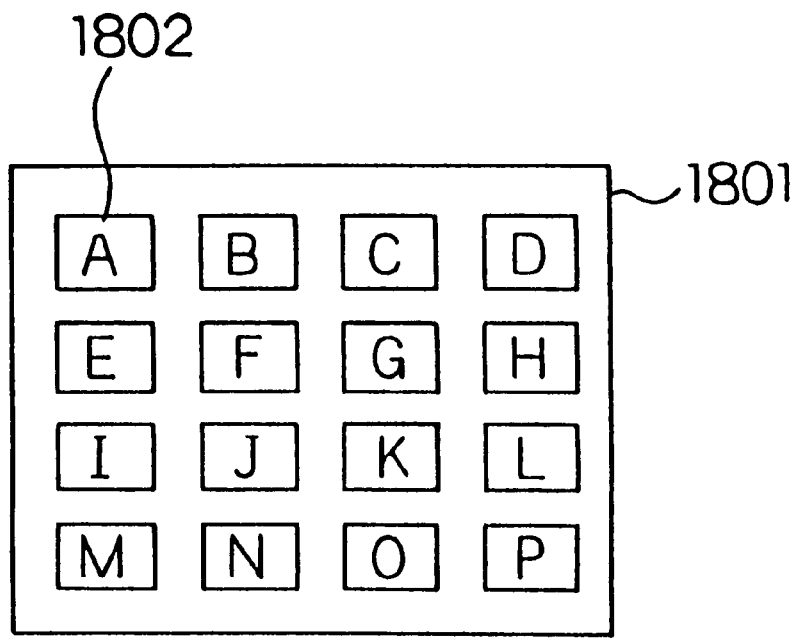
FIG. 18(a) is a diagram showing a multiple image display screen according to the ninth embodiment.
Figure 18B:
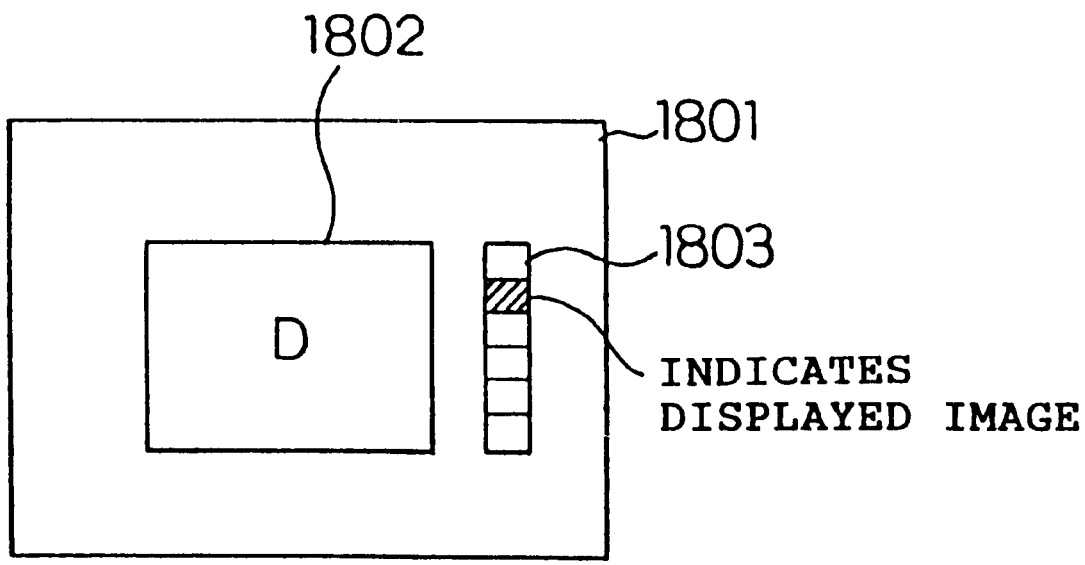
FIG. 18(b) is diagram showing a display screen of its selected image.

Next, when the six images are selected, the multi-display screen on the image display means 1704 switches to a time-division display screen, as shown in FIG. 18(*b*), and the selected images 1802 are displayed in sequence at prescribed intervals of time. At this time, a frame display 1803 indicating the number of the currently displayed image is produced on one side of the displayed image 1802. Since the user can thus check how the selected images look as moving images, he can change the selected images and select images best suited to the scene.

Figure 20:
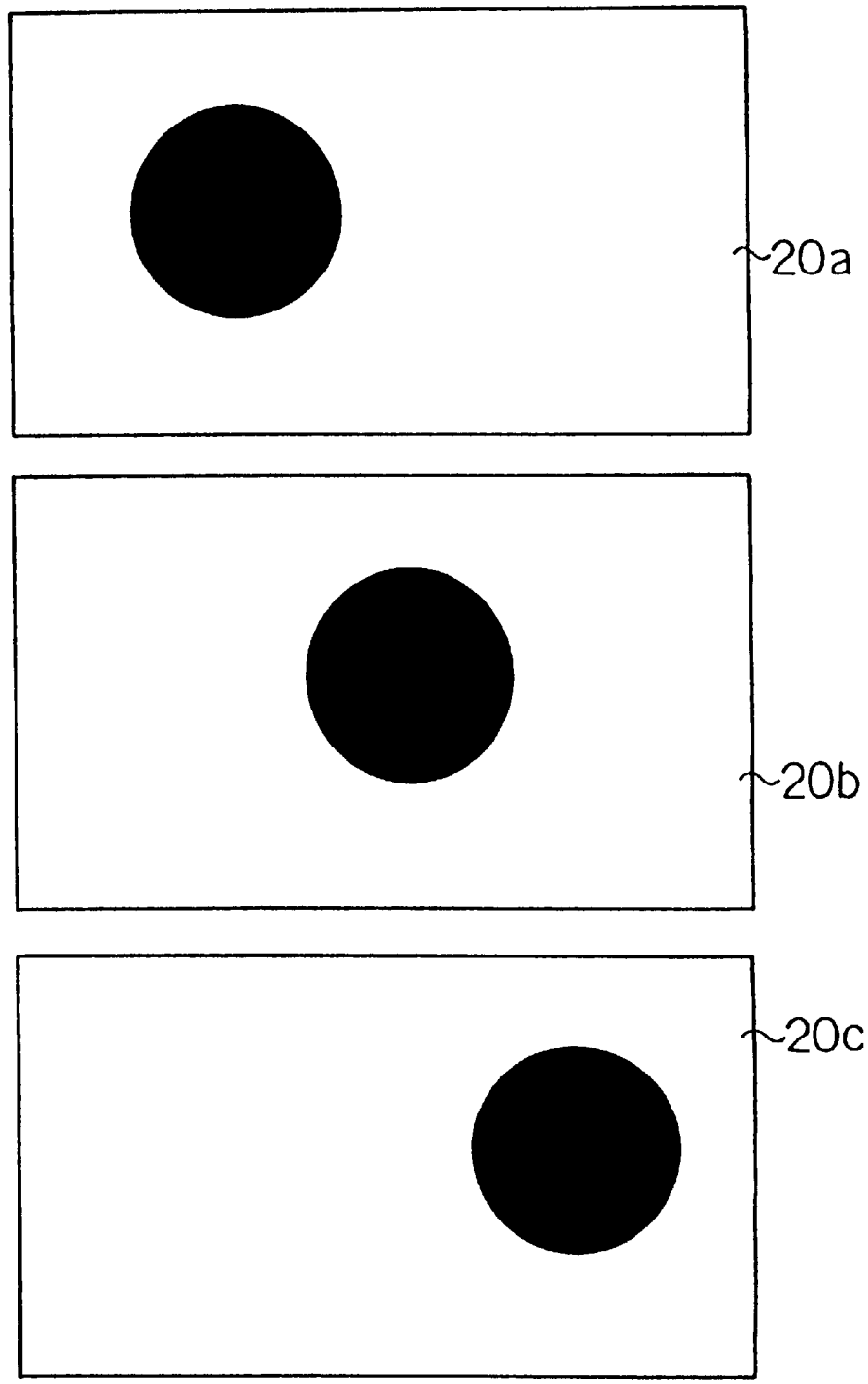
FIG. 20 is a diagram showing images on which image data conversion is performed according to the ninth embodiment.
Figure 21:
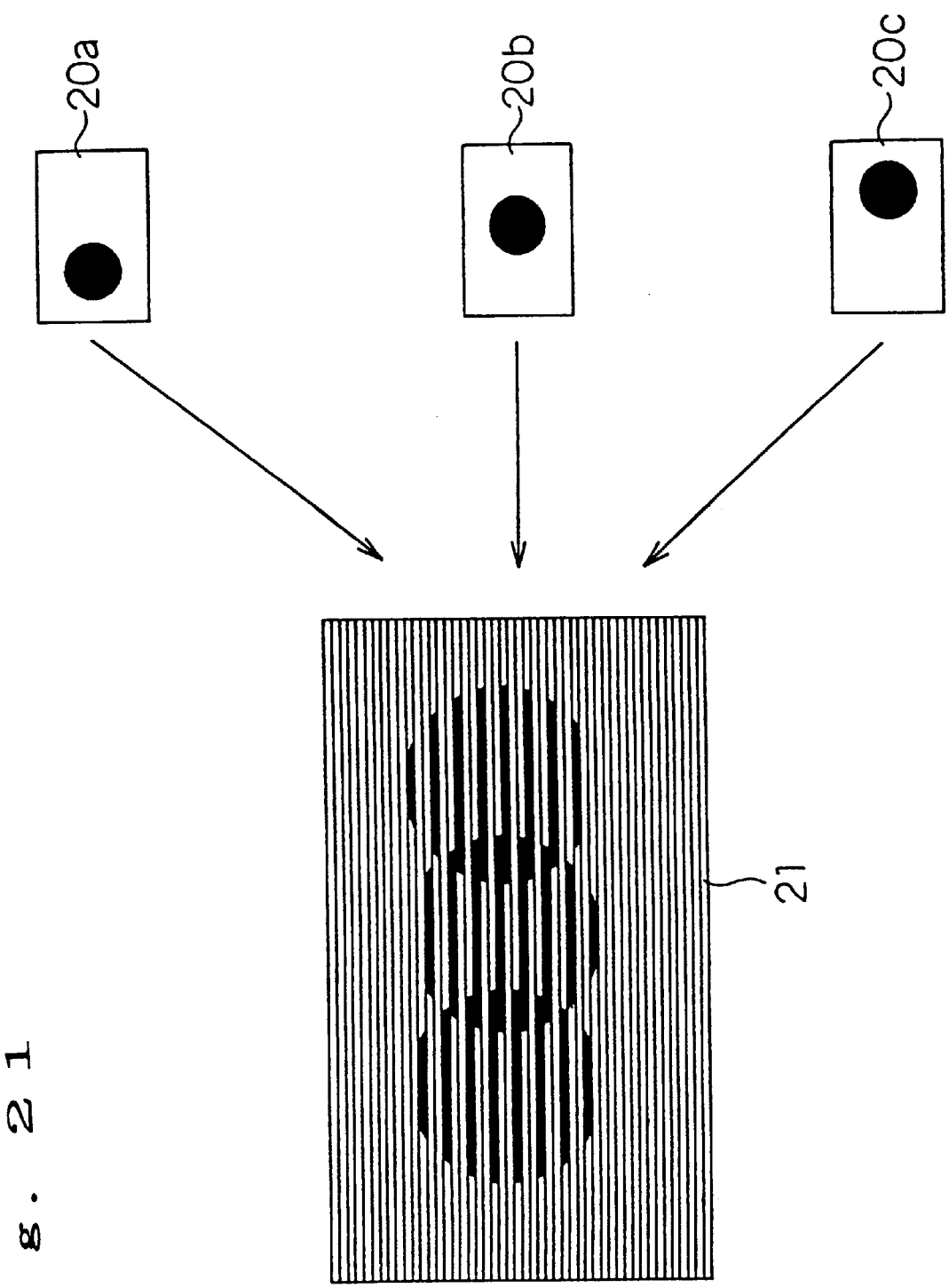
FIG. 21 is a diagram showing image data generated by converting the images in FIG. 20.
Figure 22:
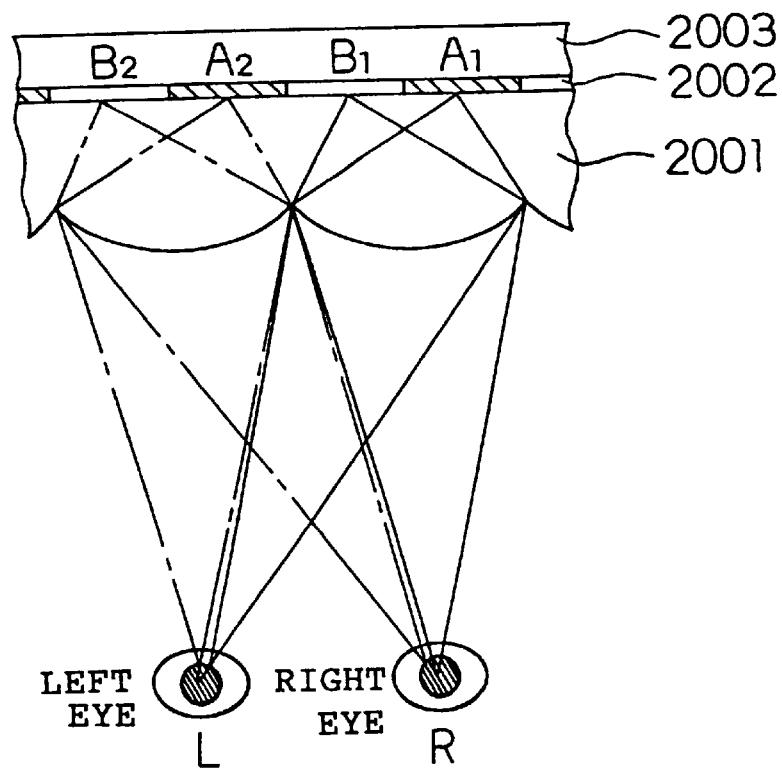
FIG. 22 is a diagram for explaining how a printed image looks stereoscopically using a lenticular sheet.

Next, when the best suited images thus selected are determined by using the selection instruction input means 1705, the determined six images are output to the image data format converting means 1703. The image data format converting means 1703 converts the six images into image data for the moving image printer 1707. The moving image printer 1707 performs printing on a lenticular sheet such as the one used in the previously described image recording apparatus of the present invention. The image data conversion here will be described by taking an example in which the conversion is done from three images, for the sake of simplicity. As shown in FIG. 20, consider three images 20*a*, 20*b*, and 20*c* showing a black dot moving from left to right. The three images are each split into stripes in such a manner as to correspond with each lens of the lenticular sheet, and the split images of stripes are arranged in the order of the image number to produce a composite image 21, as shown in FIG. 21. This image data is output to the moving image printer 1707 and printed on the lenticular sheet, to produce a picture, a photograph, or the like, in which the object's motion can be seen as viewers move their viewpoints.

The above ninth embodiment has been described by taking an example in which the image data is printed on a lenticular sheet; alternatively, the image data may be printed on an ordinary sheet or the like which is then covered with lenticular lenses.

In the above-described ninth embodiment, the number of images to be selected is set to 6, but the number of images to be selected is not limited to this particular number.

Further, in the above-described ninth embodiment, printing is performed on a lenticular sheet, but the embodiment is not limited to the illustrated example; rather, the embodiment is also applicable for a system designed to allow a plurality of images to be viewed by using slits or the like. Furthermore, it may also be applied for a lens sheet capable of both vertical and horizontal directions.

Figure 19:
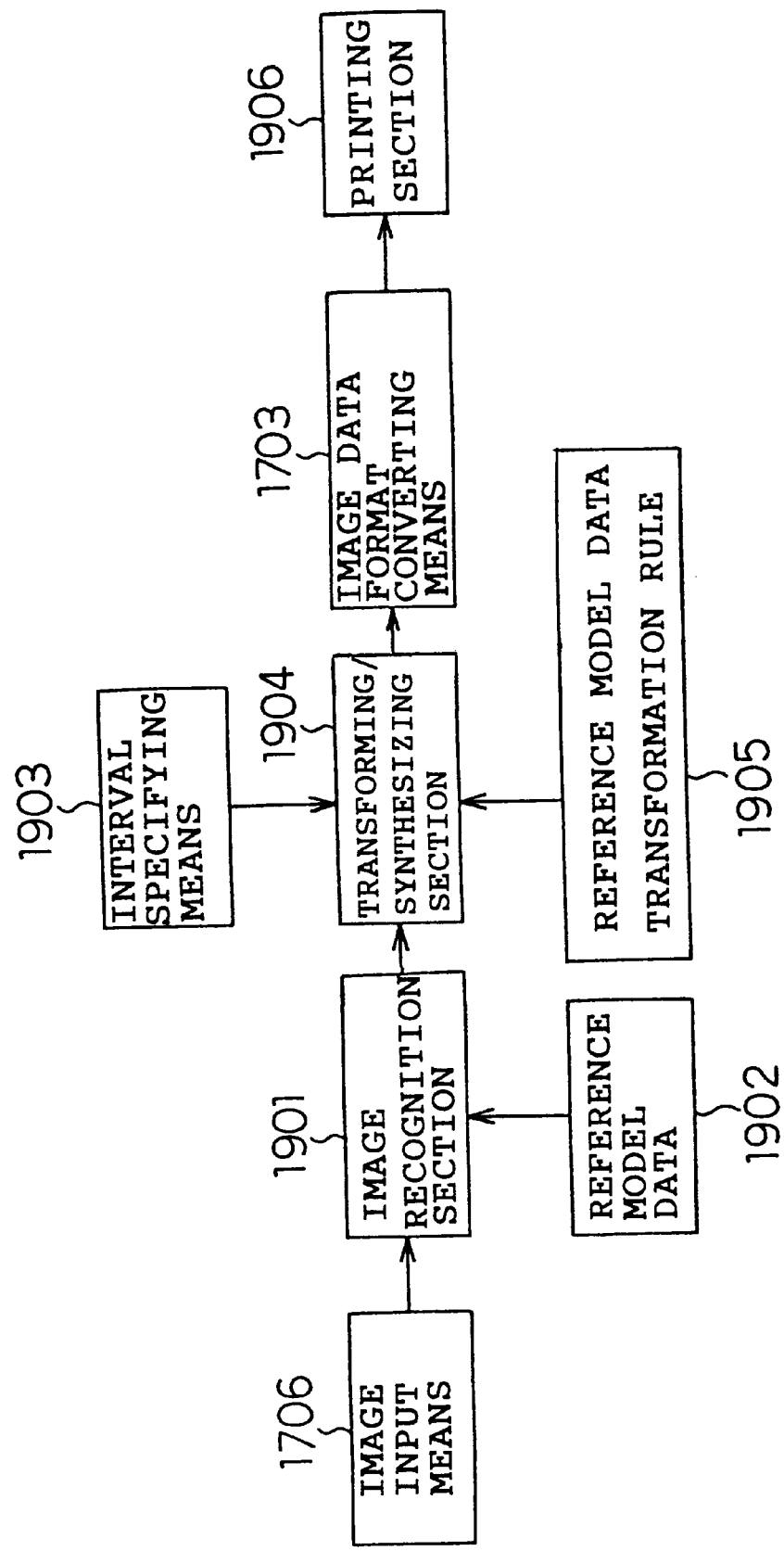
FIG. 19 is a diagram showing the configuration of an image data generating apparatus according to a 10th embodiment of the present invention.

FIG. 19 is a diagram showing the configuration of an image data generating apparatus according to a 10th embodiment of the present invention. The image data generating apparatus comprises: an image input means 1706 for inputting an image; an image recognition section 1901 for recognizing the image input from the image input means 1706, and for matching it against reference model data 1902 accumulated in advance; a transforming/synthesizing section 1904 for transforming and combining outputs from the image recognition section 1901 by using a reference model data transformation rule 1905, and thereby synthesizing a plurality of images showing state transitions; an interval specifying means 1903 for specifying the interval of state transitions; an image data format converting means 1703 for converting the plurality of images output from the transforming/synthesizing section 1904 into image data for printing; and a printing section 1906 for printing the output data of the image data format converting means 1703. The image data format converting means 1703 here is the same as that shown in FIG. 17. The image recognition section 1901, the reference model data 1902, the transforming/synthesizing section 1904, and the reference model data transformation rule 1095 together constitute an image transformation processing means.

In the present embodiment, of two or more images input from the image input means 1706, or of one or more input images and one or more prerecorded images, for example, two different images are recognized by the image recognition section 1901 by using the reference model data, and a plurality of intermediate images transitioning between the two recognized images (images gradually changing between the two images) are synthesized by the transforming/synthesizing section 1904 by using the reference model data transformation rule 1905. The plurality of images synthesized here are usually generated by interpolating between the two images at equally spaced intervals. In that case, if intermediate images are interpolated at equally spaced intervals between two completely different images such as a horse and a human, for example, the resulting intermediate images may look unnatural. To address this, if the interpolation interval is specified using the interval specifying means 1903 to vary the interval to match the scene change, natural-looking intermediate images can be synthesized. At this time, the number of intermediate images to be synthesized may be determined when synthesizing the images, according to the number of images to be printed, and only the necessary number of images may be synthesized, or alternatively, more intermediate images than necessary may be synthesized, and necessary images may be selected after synthesizing.

Figure 23:
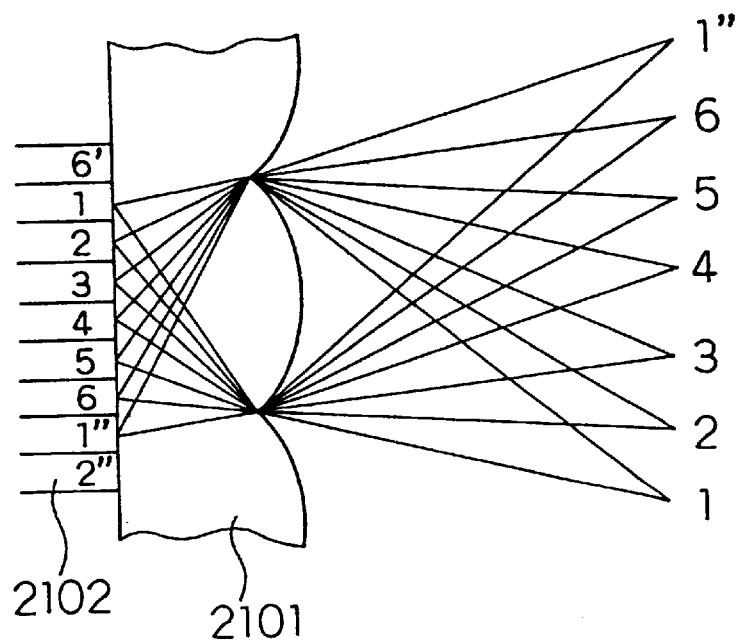
FIG. 23 is a diagram for explaining how a printed image looks animated using a lenticular sheet.

Suppose here that the number of images to be printed is six, and that the gradually changing six images are split into stripes and arranged in the changing order of 1, 2, 3, 4, 5, 6, as shown in FIG. 23. When the eye is moved from position 1 toward position 6, the image suddenly changes from 6 to 1" at position 1" (1 and 1" are split from the same image), resulting in unnatural feeling. To avoid this, in the present embodiment, the split images can be rearranged, for example, in the order of 1, 2, 3, 4, 3, 2 so that 5, 6 are printed as 3, 2. By so doing, the image changes in the order of 1, 2, 3, 4, 3, 2, 1, 2, . . . , and the changing image can be observed without causing unnatural feeling.

In the above-described 10th embodiment, the interval specifying means 1903 is provided to vary the interpolation interval, but this can be omitted. In that case, images at unequally spaced intervals can be obtained by selecting appropriate images from among the plurality of intermediate images synthesized by interpolating at equally spaced intervals.

Next, a recording method according to an 11th embodiment of the present invention will be described.

A lens sheet (lenticular sheet) was fabricated by forming lenticular lenses on one side of a vinyl chloride by compression molding.

A paint was prepared by mixing a copolymer of vinyl chloride and vinyl acetate (ESLEX A manufactured by Sekisui Chemical Co., Ltd.) and titanium oxide (R-42 manufactured by Sakai Chemical Industry Co., Ltd.) in proportions of 1:2 by weight, and by dissolving and dispersing the mixture through a solvent. This paint was applied on one side of a 6-:m thick PET film whose back was coated with a heat-resistant lubricating layer, and was dried to form a 3-:m thick white layer thereon to make a white sheet.

Using this white sheet and the above lens sheet, first an image was formed by thermally transferring dyes onto the surface of the lens sheet opposite from the lens surface thereof, as described in the foregoing embodiments. Then, the white sheet was overlaid on the image recorded surface of the lens sheet and inserted between a thermal head and a platen, and a recording signal was applied to the thermal head to thermally transfer a portion of the white layer of the white sheet onto the lens sheet.

When the image was viewed from the lens side of the thus obtained lens sheet, the image that had been seen by transmitted light could now be seen by reflected light as an image with good contrast. Further, the white layer transferred to the lens sheet maintained good adhesion to the lens sheet and was not easily separated when attempted to peel it off by a cellophane tape.

In the above-described 11th embodiment, titanium oxide was used as the white pigment, but the white pigment is not limited to this particular material; rather, any white pigments, such as barium sulphate, calcium carbonate, gypsum, silica, etc., can be used. When using titanium oxide, rutile type titanium oxide having better coloring and opacifying power is preferable to the anatase type.

As for the mixture ratio of resin and white pigment in the white layer, if the ratio of the white pigment is reduced, whiteness of the white layer reduces, and if it is increased, the white layer becomes difficult to form as a resin layer. The desirable mixture ratio by weight is 0.5 to 5 parts of white pigment for one part of resin.

As for the thickness of the white layer, if the thickness is reduced, the amount of transmitted light from the back surface of the white layer increases excessively, and if the thickness is increased, film curling, etc. become a problem when applying the white paint to the PET film. The desirable thickness of the white layer is 0.5 :m to 50 :m.

Further, an adhesion layer may be formed on top of the white layer so that it can be bonded to other substances. If the adhesion layer itself is white, the white layer can be omitted. The adhesion layer may also be formed directly on the recording layer on which the image was printed.

Moreover, images may be formed by thermally transferring dyes, in an overlaid fashion on the surface of the white layer formed in the previously described manner. More specifically, images of yellow (Y), magenta (M), and cyan (C) colors a re first recorded on the surface of the sheet opposite from the lens surface thereof, then the white layer is transferred on top of that, and finally, recording by Y, M, and C is done. For this recording, ink sheets, for example, of Y, M, C, white layer, and fusible inks, are used.

When the thus obtained sheet is observed from the lens side thereof, an image that changes with changing angle of viewing can be seen, and when the same is observed from the back of the lens, an image that remains the same regardless of the angle of viewing can be seen.

FIG. 24 is a schematic diagram showing the construction of an image recording apparatus according to a 12th embodiment of the present invention. This embodiment differs from the first embodiment of FIG. 1 in that a fastening member 117 is provided instead of the roller 114 for pressing the lenticular sheet 101 from above, and in that the pressing member 107 is made retractable as shown by dashed lines. Here, the flexible layer 105 is made slightly smaller in size than the size of the lenticular sheet 101 in the sheet feed direction. In other respects, the construction and operation are the same as the embodiment shown in FIG. 1.

In the present embodiment, after the prescribed face 115 of the lenticular sheet 101 has been pressed against the limiting member 106 by the pressing force of the pressing member 107, the lenticular sheet 101 is held securely onto the lenticular sheet holding member 104 by the fastening member 117. After the lenticular sheet 101 has been secured in place in this way, the pressing member 107 is moved backward as shown by the dashed lines.

This substantially prevents displacements from being caused in the lenticular sheet 101. Furthermore, when the film thickness of the lenticular sheet 101 is small, the pressing force of the pressing member 107 cannot be made large because of poor rigidity of the lenticular sheet 101, but in such cases also, displacements can be prevented. Moreover, when performing recording, since the pressing member 107 is moved away from the lenticular sheet 101 which has been pressed into position by the former, recording can be made up to the rearmost edge of the lenticular sheet 101; further, since the thermal head 102 does not hit the pressing member 107, freedom of its movement is increased.

Figure 25:
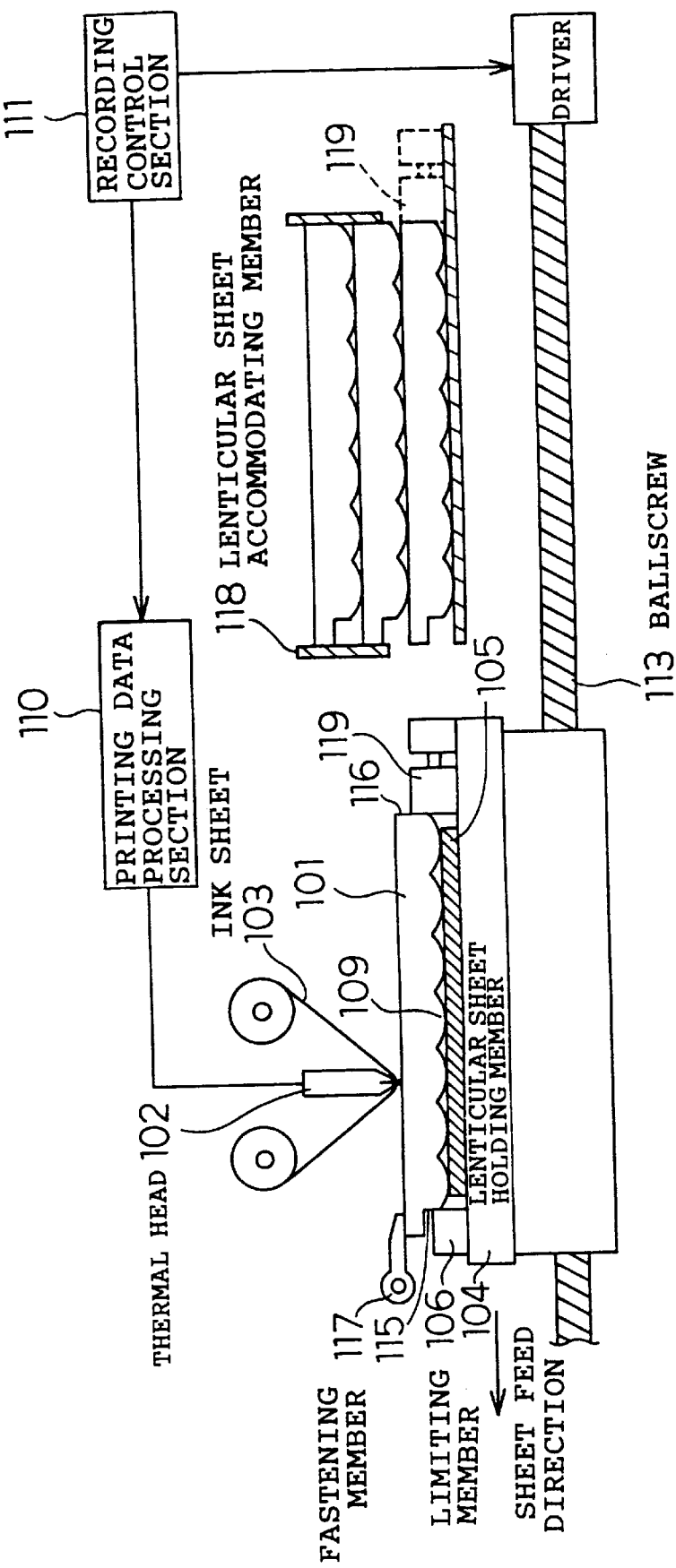
FIG. 25 is a diagram showing the construction of another example of the 12th embodiment.

FIG. 25 shows an example of a variant construction that can be considered for the image recording apparatus using the fastening member of the present embodiment. The illustrated example is characterized by the provision of a lenticular sheet accommodating member 118 for accommodating a plurality of lenticular sheets and a lenticular sheet feeding means 119 for feeding the lenticular sheets onto the lenticular sheet holding member 104, the lenticular sheet feeding means 119 also serving as a pressing member. More specifically, after pushing out one of the accommodated lenticular sheets and feeding it onto the lenticular sheet holding member 104, the lenticular sheet feeding means 119 now works as a pressing member and presses the lenticular sheet 101 toward the limiting member 106. Next, after the lenticular sheet 101 has been secured in position by the fastening member 117, the lenticular sheet feeding means 119 is returned to its original position in the lenticular sheet accommodating member 118. In this case, only the lenticular sheet feeding means 119 may be constructed to be movable, but if the lenticular sheet holding member 104 is also constructed to simultaneously move toward the lenticular sheet accommodating member 118, it is more preferable since the lenticular sheet feeding time can then be reduced. In the illustrated example, there is no need to provide a pressing member separately.

Figure 26:
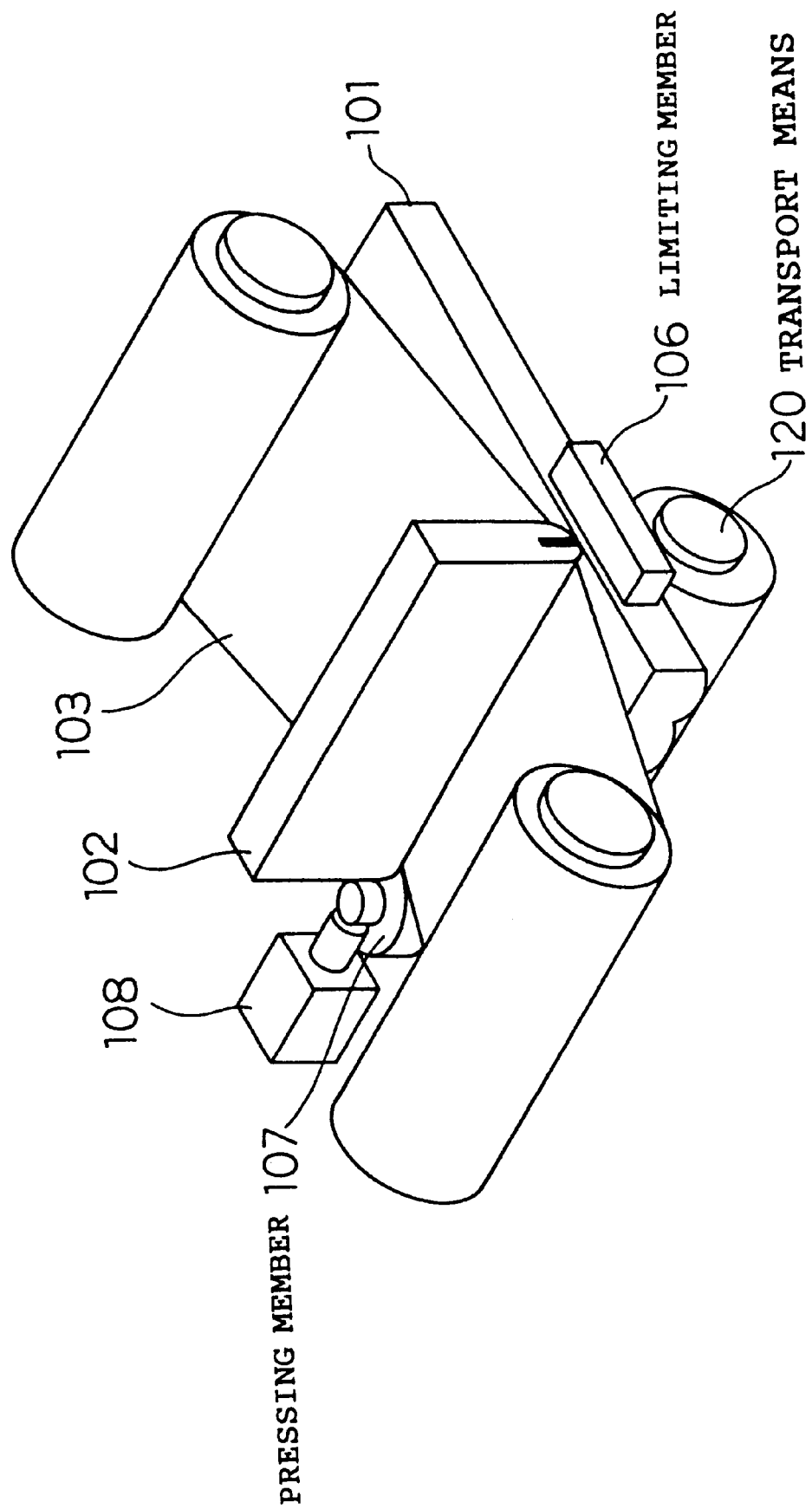
FIG. 26 is a perspective view showing an image recording apparatus according to a 13th embodiment of the present invention.

FIG. 26 is a perspective view showing an image recording apparatus according to a 13th embodiment of the present invention. The image recording apparatus of this embodiment is characterized in that the lenticular sheet holding member for holding the lenticular sheet 101 thereon is omitted, and instead, the lenticular sheet 101 is supported by a transport means 120 using a roll platen, as shown in FIG. 26. The positioning mechanism for the lenticular sheet 101 is constructed using a limiting member 106 and a roll-shaped pressing member 107 rotatably supported in a plane substantially parallel to the plane of the lenticular sheet. The pressing member 107 is moved by means of a solenoid 108. This construction simplifies the mechanism for supporting the lenticular sheet 101.

Figure 27:
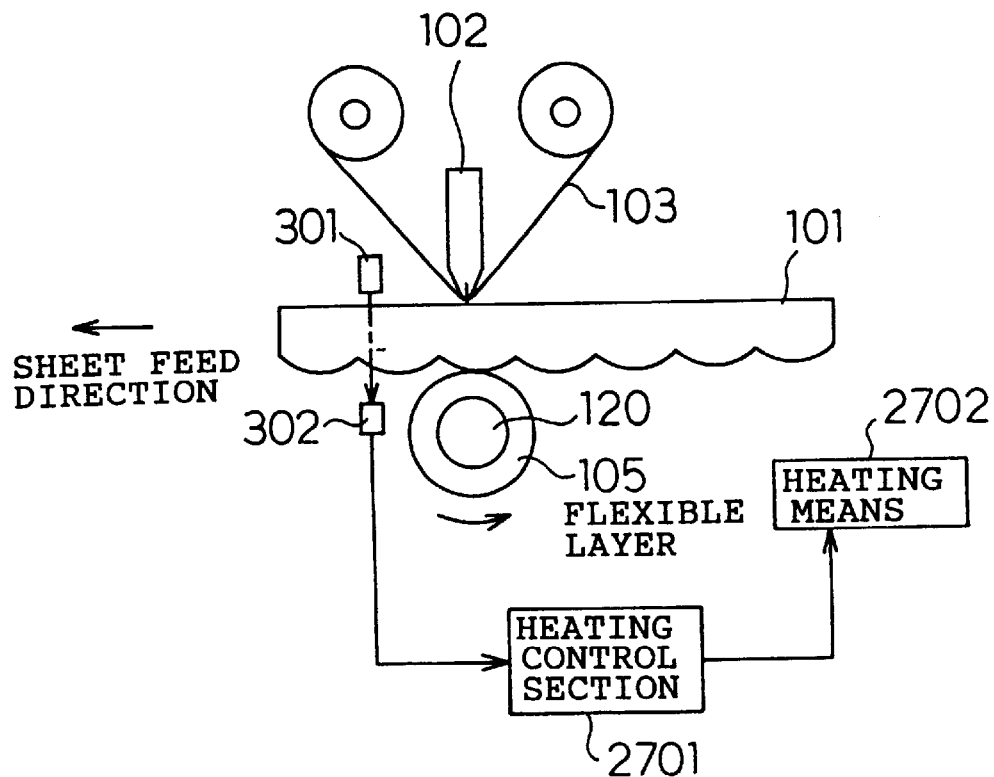
FIG. 27 is a schematic diagram showing the construction for controlling the heating of a lenticular sheet according to the 13th embodiment.

FIG. 27 shows an example in which an arrangement for controlling the heating of the lenticular sheet 101 is incorporated in the image recording apparatus of the present embodiment. In the construction of FIG. 27, a light emitter 301 and a light receptor 302 are disposed opposite each other across the lenticular sheet 101, and the output of the light receptor 302 is coupled to a heating control section 2701 which in turn is coupled to a heating means 2702. In the present embodiment, the light emitter 301 and light receptor 302 read the lens pitch of the lenticular sheet 101, and in accordance with the lens pitch thus read, the heating power of the heating means 2702 is controlled through the heating control section 2701 so that the lens pitch of the lenticular sheet 101 is set to the desired pitch. Here, such methods as heated air blowing and far-infrared radiation can be considered for use as the heating means 2702.

Figure 28:
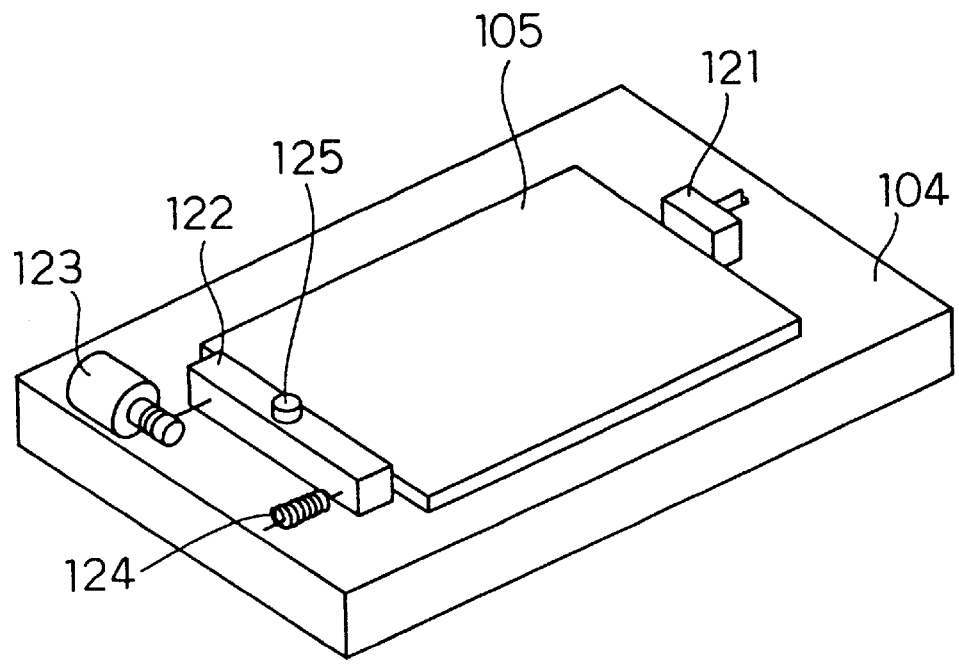
FIG. 28, is a schematic perspective view showing a positioning mechanism according to a 14th embodiment of the present invention.

FIG. 28 is a schematic perspective view showing a positioning mechanism according to a 14th embodiment of the present invention. In the previously described construction of the second embodiment shown in FIG. 3, when the longitudinal direction of the lenses of the lenticular sheet held on the lenticular sheet holding member 104 is displaced from the direction perpendicular or parallel to the direction of feeding, the entire lenticular sheet holding member 104 is rotated to align its orientation, but this increases the complexity of the rotating mechanism, etc. as well as the size of the apparatus. In the present embodiment, as shown in FIG. 28, the positioning mechanism is constructed using a pressing member 121, a limiting member 122 rotatable about a shaft 125, a motor 123 for adjusting the orientation of the limiting member 122, and a spring 124. Of these, the shaft 125, the motor 123, and the spring 124 constitute a limiting member relative position varying mechanism. It is further preferable if the pressing member 121 is constructed so that its pressing face is swingable to match the orientation of the limiting member 122. Here, the orientation of the limiting member 122 can be varied by pulling or releasing one end of the limiting member 122 by driving the motor 123. This simplifies the construction of the apparatus. It will be recognized here that the limiting member relative position varying mechanism is not limited to the construction of the present embodiment, the only requirement being that the mechanism be so constructed as to be able to vary the relative position of the limiting member 122.

Figure 29:
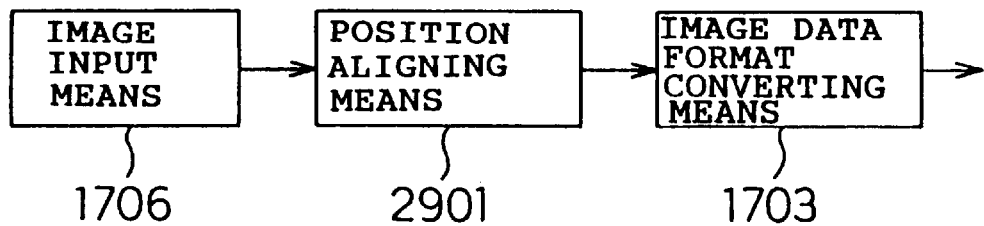
FIG. 29 is a diagram showing the configuration of an image data generating apparatus according to a 15th embodiment of the present invention.

FIG. 29 is a diagram showing the configuration of an image data generating apparatus according to a 15th embodiment of the present invention. The image data generating apparatus comprises an image input means 1706 for inputting a plurality of images, a position aligning means 2901 for aligning the position of the plurality of input images, and an image data format converting means 1703 for generating an image for a moving image printer from the aligned images.

Figure 30:
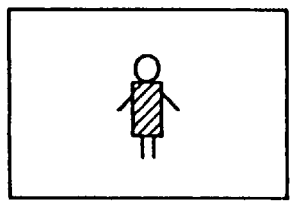
FIGS. 30(a)–30(e) are diagrams for explaining position alignment according to the 15th embodiment.
Figure 30:
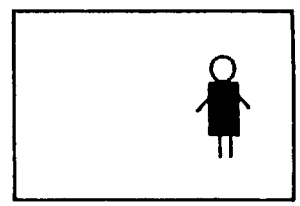
Figure 30:
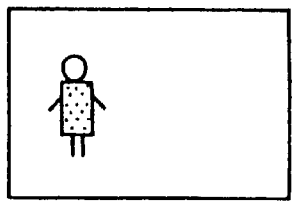
Figure 30:
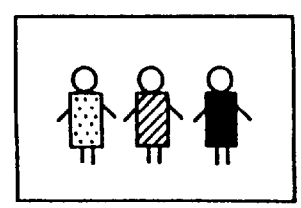
Figure 30:
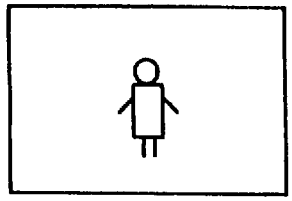

For example, the images shown in FIGS. 30(*a*), 30(*b*) and 30(*c*) are produced by shooting the same person in different clothes, and the image shown FIG. 30(*d*) is produced by combining the three images by simply overlaying one image on another. In this image, the position of the person is displaced since the person when shot stood at different positions. If this image were used directly to generate an image for a moving image printer, the resulting image card would be very difficult to view because the position of the person changes as the angle of viewing is changed. To address this, in the present embodiment, an image for a moving image printer is generated after aligning the position of the person on the three images so that the person is located at the same position as shown in FIG. 30(*e*). In this way, the person can be viewed as standing at the same position but in different clothes if the angle of viewing is changed. An easy-to-view image card can thus be produced.

Here, to implement the function of the position aligning means 2901, a manual method, a semi-automatic method, or an automatic method may be employed. In the case of a manual method, the position is aligned by moving the image in X and Y directions while viewing the screen. In a semi-automatic method, first a reference point (for example, the center position of the face) is entered for each image by manual operation, and then, the position is aligned by automatically performing image coordinate conversion so that the coordinates of the reference point coincide between each image. In an automatic method, the operation to enter the reference point, performed manually in the semi-automatic method, is performed automatically. A known method such as a block matching method can be used as the method for automatically finding the reference point.

Figure 31:
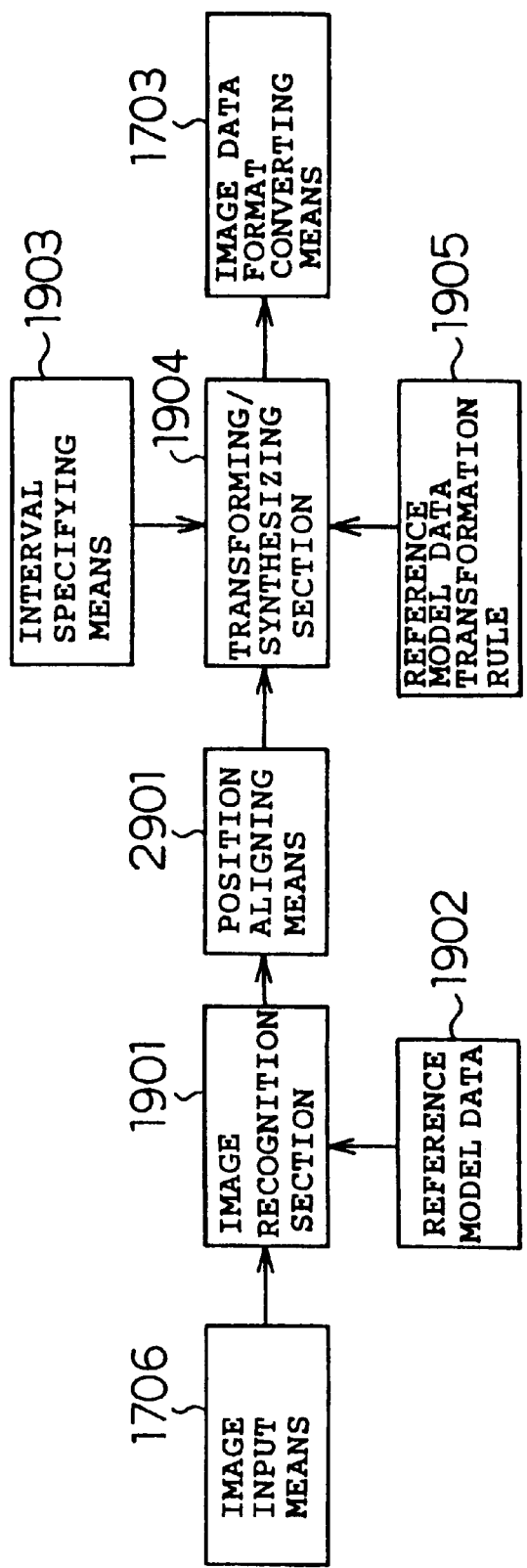
FIG. 31 is a diagram showing the configuration of an image data generating apparatus according to a 16th embodiment of the present invention.

FIG. 31 is a diagram showing the configuration of an image data generating apparatus according to a 16th embodiment of the present invention. The configuration of this embodiment differs from the previously described image data generating apparatus of the 10th embodiment shown in FIG. 19 in that the above-described position aligning means 2901 is provided between the image recognition section 1901 and the transforming/synthesizing section 1904. In other respects, the configuration and operation are the same as the apparatus shown in FIG. 19.

In this configuration, the reference point can be found by recognizing each image by the image recognition section 1901, and the position can be aligned using the reference point. For example, when synthesizing intermediate images from face images of two persons, major parts of the face are recognized from the input face images of the two persons by using reference model data. One of the major parts is used as the reference point; for example, the nose or mouth can be used as the reference point.

Figure 32:
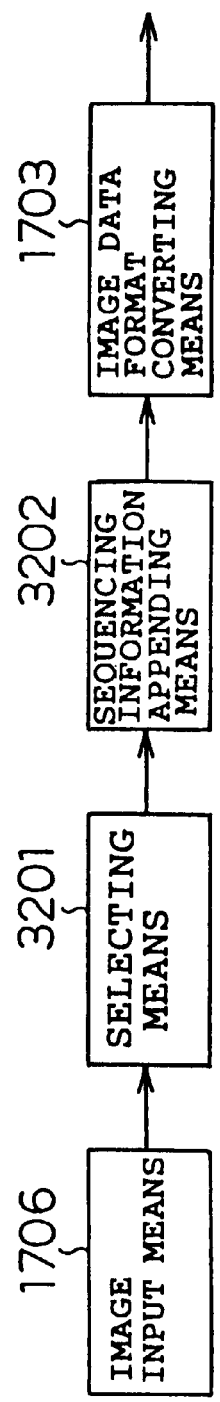
FIG. 32 is a diagram showing the configuration of an image data generating apparatus according to a 17th embodiment of the present invention.

FIG. 32 is a diagram showing the configuration of an image data generating apparatus according to a 17th embodiment of the present invention. The image data generating apparatus comprises an image input means 1706 for inputting a plurality of images, a selecting means 3201 for selecting a predetermined number of images, including their sequence, from among the plurality of input images, a sequencing information appending means 3202 for appending to the predetermined number of selected images information concerning their sequence, and an image data format converting means 1703 for generating an image for a moving image printer from the images supplied from the sequencing information appending means 3202.

For the sequencing information, numerals, symbols, etc. corresponding to the sequence can be used. FIG. 33(*a*) shows the example of displaying numerals along with images, and FIG. 33(*b*) shows an example in which the image sequence is displayed by changing a mark position.

EXPLOITATION IN INDUSTRY

As is apparent from the above description, the present invention has the advantage of being able to improve the accuracy of print positions when printing a plurality of images in separate procedures.

The present invention has the further advantage of being able to produce printed products capable of presenting natural-looking moving images.

Furthermore, the present invention has the advantage of being able to produce printed products capable of presenting gradually changing images without causing unnaturalness.

Moreover, the present invention has the advantage of being able to produce printed images with enhanced clarity for viewing.

What is claimed is:

1. An image recording apparatus for use with a lenticular sheet comprising:

supporting means for supporting the lenticular sheet;

recording means for recording an image on a surface of said lenticular sheet;

moving means for moving said recording means and said supporting means relative to each other; and positioning means for positioning said lenticular sheet in a prescribed direction and in a prescribed position over said lenticular sheet supporting means.

2. An image recording apparatus according to claim 1, wherein said positioning mechanism includes a limiting member for limiting a prescribed face of said lenticular sheet, and a pressing member for pressing said lenticular sheet toward said limiting member, and wherein said lenticular sheet is positioned with said prescribed face pressed against said limiting member by said pressing member.

3. An image recording apparatus according to claim 2, wherein said prescribed face of said lenticular sheet is substantially parallel to the longitudinal direction of cylindrical lenses of said lenticular sheet.

4. An image recording apparatus according to claim 2, wherein the surface of said lenticular sheet supporting member which contacts said lenticular sheet contains at least a fluorine polymer material.

5. An image recording apparatus according to claim 2, wherein said positioning mechanism includes an additional limiting member arranged in a direction at right angles with respect to said limiting member, and an additional pressing member for pressing said lenticular sheet against said additional limiting member.

6. An image recording apparatus according to claim 5, wherein said positioning mechanism adjusts the pressing forces of said pressing member and said additional pressing member so that the pressing force in a direction perpendicular to the longitudinal direction of cylindrical lenses of said lenticular sheet supported on said lenticular sheet supporting member becomes larger than the pressing force in a direction parallel to said longitudinal direction.

7. An image recording apparatus according to claim 1, wherein said positioning mechanism includes angle detection means for detecting the angle of the longitudinal direction of cylindrical lenses of said lenticular sheet relative to the direction of relative movement caused by said moving mechanism, and a rotating mechanism for rotating said lenticular sheet supporting member in accordance with the angle detected by said angle detection means so that the angle of the longitudinal direction of said cylindrical lenses becomes substantially perpendicular or parallel with respect to the direction of said relative movement.

8. An image recording apparatus according to claim 7, wherein said angle detection means includes light radiating means for radiating light to said lenticular sheet, and light receiving means for receiving the light radiated from said light radiating means and transmitted through said lenticular sheet.

9. An image recording apparatus according to claim 7, wherein said angle detection means includes light radiating means for radiating light to said lenticular sheet, a reflecting member disposed on the opposite side of said lenticular sheet from said light radiating means, and light receiving means for receiving the light radiated from said light radiating means and reflected by said reflecting member.

10. An image recording apparatus according to claim 7, wherein said positioning mechanism first rotates said lenticular sheet supporting member through a prescribed angle by means of said rotating mechanism, and then detects by using said angle detection means the angle of the longitudinal direction of the cylindrical lenses of said lenticular sheet relative to the direction of the movement caused by said moving mechanism.

11. An image recording apparatus according to claim 7, wherein a line pattern of the same pitch as the lens pitch of said lenticular sheet is formed on the surface of said lenticular sheet supporting member which contacts said lenticular sheet, and said angle detection means detects said angle by reading the pitch of a moire pattern caused by said line pattern and said lenticular sheet.

12. An image recording apparatus according to claim 7, wherein said angle detection means is an irregularity amount detection means having a probe which is made to contact a recessed portion between each cylindrical lens of said lenticular sheet.

13. An image recording apparatus according to claim 1, wherein said recording means includes a thermal head and an ink sheet coated with a sublimation dye.

14. An image recording apparatus according to claim 13, wherein at least the recording surface of said lenticular sheet contains an acrylic resin or a vinyl chloride resin or a butyral resin.

15. An image recording apparatus according to claim 13, comprising a thermal head tilting mechanism capable of mounting said thermal head in such a manner that the aligning direction of heating elements of said thermal head is tilted relative to a direction perpendicular to the direction of relative movement caused by said moving mechanism, and wherein the projection pitch of each heating element of said thermal head, relative to the direction perpendicular to the direction of said relative movement, is made variable by supporting said lenticular sheet on said lenticular sheet supporting member in such a manner that the longitudinal direction of cylindrical lenses of said lenticular sheet is parallel to the direction of said relative movement.

16. An image recording apparatus according to claim 1, wherein said positioning mechanism includes a limiting member for limiting a prescribed face of said lenticular sheet, a pressing member for pressing said lenticular sheet toward said limiting member, and a fastening member for fastening said lenticular sheet onto said lenticular sheet supporting member, and wherein said lenticular sheet is positioned with said prescribed face pressed against said limiting member by said pressing member, and after the positioning is done, said lenticular sheet is maintained in its positioned condition by fastening said lenticular sheet onto said lenticular sheet supporting member by said fastening member.

17. An image recording apparatus according to claim 16, wherein after said lenticular sheet is fastened to said lenticular sheet supporting member by said fastening member, the pressing of said prescribed face against said limiting member by said pressing member is released.

18. An image recording apparatus for use with a lenticular sheet comprising:
supporting means for supporting the lenticular sheet;
heating means for heating said lenticular sheet to a predetermined temperature;
recording means for recording an image on a surface of said lenticular sheet; and
moving means for moving said recording means and said lenticular sheet supporting member relative to each other.

19. An image recording apparatus according to claim 18, comprising pressing means for pressing said lenticular sheet onto said lenticular sheet supporting member, and wherein said heating means is provided in said lenticular sheet supporting member.

20. An image recording apparatus according to claim 18, comprising lens pitch reading means for reading the lens pitch of cylindrical lenses of said lenticular sheet, and heating control means for controlling the heating of said lenticular sheet in accordance with the thus read lens pitch.

21. An image recording apparatus according to claim 18, comprising a plurality of lenticular sheet supporting members, and wherein, while an image is being recorded on a lenticular sheet supported on one lenticular sheet supporting member, said heating means heats a lenticular sheet supported on another lenticular sheet supporting member to a desired temperature.

22. An image recording apparatus for use with a lenticular sheet comprising:
supporting means for supporting the lenticular sheet;
recording means for recording an image on a surface of said supported lenticular sheet;
moving means for moving said recording means and said supporting means in a direction relative to each other;
lens pitch reading means for reading a lens pitch of lenses of said lenticular sheet; and
recording control means for controlling recording of said recording means responsive to an output of said lens pitch recording means;
wherein, said supporting means supports said lenticular sheet such that a longitudinal direction of the lenses of said lenticular sheet is perpendicular to the direction of said moving mechanism.

23. An image recording apparatus for use with a lenticular sheet comprising:
supporting means for supporting said lenticular sheet;
recording means for recording an image on a surface of said supported lenticular sheet;
moving means for moving said recording means and said supporting means in a direction relative to each other;
temperature detection means for detecting at least one of i) an ambient temperature, ii) a temperature within said apparatus, iii) a temperature near said lenticular sheet, and iv) a temperature of said lenticular sheet; and
recording control means for controlling recording of said recording means responsive to an output of said temperature detection means,
wherein, said supporting means supports said lenticular sheet such that a longitudinal direction of lenses of said lenticular sheet is perpendicular to the direction of said moving mechanism.

24. An image recording apparatus for use with a lenticular sheet comprising:
supporting means for supporting the lenticular sheet;
recording means for recording an image on a surface of said supported lenticular sheet;
moving means for moving said recording means and said supporting means in a direction relative to each other;
light radiating means for radiating light near a recording position on said lenticular sheet where recording is to be made by said recording means, said light radiating means disposed over a first surface of said lenticular sheet;
a reflecting member disposed over a second surface of said lenticular sheet from said light radiating means, said second surface opposite said first surface of said lenticular sheet;
light receiving means, disposed over said first surface of said light radiating means, for receiving the light radiated from said light radiating means and reflected by said reflecting member; and
recording control means for controlling said recording means, while detecting a position of said lenticular sheet by said light radiating means, said reflecting member, and said light receiving means,
wherein, said supporting means supports said lenticular sheet such that a longitudinal direction of lenses of said lenticular sheet is perpendicular to the direction of said moving mechanism.

25. An image recording apparatus according to claim 24, wherein the radiating direction of said light radiating means is tilted relative to the surface of said lenticular sheet.

26. An image recording apparatus according to claim 25, wherein a reflecting surface of said reflecting member is oriented in such a direction as to reflect the light radiated from said light radiating means back into the direction of said light radiating means.

27. An image recording apparatus according to claim 24, wherein said recording control means has said recording means perform at least two recording operations to form a color image, and wherein the second and later recording operations are performed by using the detected position used in the first recording operation.

28. An image recording apparatus for use with a lenticular sheet comprising:
supporting means for supporting said lenticular sheet, said lenticular sheet having at least i) a recessed portion and ii) a raised portion formed at a first pitch, or at a pitch equal to an integral submultiple of, a lens pitch of lenses of said lenticular sheet;
recording means for recording an image on a surface of said supported lenticular sheet;
moving means for moving said recording means and said supporting means relative to each other;
position detection means to detect at least one of the recessed portion and the raised portion of said lenticular sheet; and recording control means for controlling said recording means responsive to an output of said position detection means.

29. An image data generating apparatus for use with input images comprising:

display means for producing a display of a plurality of said input images;

selection instructing means for selecting a predetermined number of images from among the plurality of images displayed on said display means;

image display means for sequentially displaying said selected images;

image determining means for determining said selected images; and image data format converting means for generating an image for a printer by splitting said determined images into predetermined regions.

30. An image data generating apparatus according to claim 29, wherein said image data format converting means splits each of said determined images into stripes in such a manner that each set of split images of said predetermined number of images corresponds to each cylindrical lens of a lenticular sheet on which recording is made by said moving image printer, and arranges the same in accordance with said sequence.

31. An image data generating apparatus comprising:

image input means for inputting a plurality of images;

image transformation processing means for generating, based on said plurality of input images, a plurality of intermediate transforming images transitioning between said input images by digital computation;

image data format converting means for generating an image for printing by splitting each of all or part of said plurality of input images and said generated transforming images into predetermined regions and by arranging the same in a prescribed order corresponding to the sequence of said plurality of images and said transforming image transitions; and image printing means for printing the image thus generated for printing;

wherein at least the first and last images in the sequence of said plurality of images and said transforming image transitions are continuous in content.

32. An image data generating apparatus comprising:

image input means for inputting a plurality of images;

image transformation processing means for generating, based on said plurality of input images, a plurality of intermediate transforming images transitioning between said input images by digital computation;

image data format converting means for generating an image for printing by splitting each of all or part of said plurality of input images and said generated transforming images into predetermined regions and by arranging the same in a prescribed order corresponding to the sequence of said plurality of images and said transforming image transitions; and image printing means for printing the image thus generated for printing;

wherein said image transformation processing means includes an interval specifying means for allowing an operator to specify an interval at which the intermediate transforming images are to be generated.

33. An image recording apparatus for use with a lenticular sheet comprising:

transport means for transporting said lenticular sheet;

recording means for recording an image on a surface of said transported lenticular sheet;

limiting means for limiting a prescribed face of said lenticular sheet; and pressing means for pressing said lenticular sheet toward said limiting means, wherein, when recording an image on said lenticular sheet by said recording means, said lenticular sheet is transported by pressing said prescribed face against said limiting means by said pressing means.

34. An image recording apparatus according to claim 33, wherein said pressing member includes a roll-shaped member supported rotatably about an axis substantially perpendicular to the surface of said lenticular sheet.

35. An image recording apparatus for use with a lenticular sheet comprising:

supporting means for supporting said lenticular sheet;

recording means for recording an image on a surface of said supported lenticular sheet;

moving means for moving said recording means and said supporting means in a direction relative to each other;

angle detection means for detecting an angle of a longitudinal direction of lenses of said lenticular sheet relative to the relative direction of said moving mechanism; and position varying means for varying a position of said lenticular sheet relative to said supporting means in accordance with the angle detected by said angle detection means so that the angle of the longitudinal direction of said lenses is substantially perpendicular or parallel with respect to the relative direction of said moving mechanism.

36. An image recording apparatus according to claim 35, wherein said positioning position varying mechanism includes a limiting member for limiting a prescribed face of said lenticular sheet, a pressing member for pressing said lenticular sheet toward said limiting member, and a limiting member relative position varying mechanism for varying the position of said limiting member relative to said lenticular sheet supporting member.

37. An image recording method for use with a lenticular sheet, comprising the steps of:

(a) positioning and supporting said lenticular sheet in a prescribed direction and in a prescribed position on a lenticular sheet supporting member; and (b) recording an image on a surface of said supported lenticular sheet by moving said lenticular sheet and an image recording means relative to each other.

38. An image recording method according to claim 37, wherein said supporting step includes the step of pressing said lenticular sheet and maintaining the same in a limited condition at least in an initial period.

39. An image recording method according to claim 37, wherein said supporting step includes the step of securing said lenticular sheet to said lenticular sheet supporting member.

40. An image recording method for use with a lenticular sheet comprising the steps of:

(a) supporting a lenticular sheet on said lenticular sheet supporting member;

(b) detecting an angle of a longitudinal direction of lenses of said lenticular sheet supported on said lenticular sheet supporting member;

(c) rotating said lenticular sheet supporting member in accordance with said detected angle so that the angle of the longitudinal direction of said lenses is substantially perpendicular or parallel with respect to the direction of relative movement of said lenticular sheet; and (d) recording an image on a surface of said supported lenticular sheet by moving said lenticular sheet and an image recording means relative to each other.

41. An image recording method according to claim 40, further comprising the step of rotating said lenticular sheet supporting member through a prescribed angle before detecting the angle of the longitudinal direction of the cylindrical lenses of said lenticular sheet.

42. An image recording method for use with a lenticular sheet, comprising the steps of:
(a) supporting a lenticular sheet on said lenticular sheet supporting member;
(b) heating said lenticular sheet to a desired temperature; and
(c) recording an image on a surface of said supported lenticular sheet by moving said lenticular sheet and an image recording means relative to each other.

43. An image recording method for use with a lenticular sheet, comprising the steps of:
(a) supporting a lenticular sheet on said lenticular sheet supporting member;
(b) reading a lens pitch of lenses of said supported lenticular sheet;
(c) heating said supported lenticular sheet to a desired temperature in accordance with the lens pitch; and
(d) recording an image on a surface of said heated and supported lenticular sheet by moving said lenticular sheet and an image recording means relative to each other.

44. An image recording method for use with a lenticular sheet, comprising the steps of: (a) supporting said lenticular sheet on a lenticular sheet supporting member such that a longitudinal direction of lenses of said lenticular sheet is parallel to a direction of movement of said lenticular sheet; (b) tilting an aligning direction of heating elements of a thermal head contained in an image recording means at a prescribed angle with respect to the direction of movement of said image recording means and said lenticular sheet; and
(c) recording an image on a surface of said supported lenticular sheet by moving said lenticular sheet and said image recording means relative to each other.

45. An image recording method for use with a lenticular sheet, comprising the steps of:
(a) detecting at least one of i) an ambient temperature, ii) a temperature within a recording apparatus, iii) a temperature proximate to said lenticular sheet, and iv) a temperature of said lenticular sheet;
(b) determining a recording timing in accordance with the detected temperature; and
(c) recording an image on a surface of said lenticular sheet with said determined timing by moving said lenticular sheet and an image recording means relative to each other.

46. An image recording method for use with a lenticular sheet, comprising the steps of:
(a) supporting said lenticular sheet on a lenticular sheet supporting member such that a longitudinal direction of said lenticular sheet is substantially orthogonal to a direction of movement of said lenticular sheet;
(b) detecting a position of said supported lenticular sheet by using a reflecting member and by performing light radiation and light reception on a side of said lenticular sheet; and (c) recording an image on a surface of said lenticular sheet in accordance with the position of said lenticular sheet by moving said lenticular sheet and an image recording means relative to each other while performing the position detection.

47. An image recording method for forming a color image by performing at least two recording operations, wherein the first recording operation is performed using the image recording method of claim 46, and the second and later recording operations are performed by using the detected position used in the first recording operation.

48. An image data generation method for use with a plurality of images, comprising the steps of:
(a) inputting said plurality of images;
(b) producing a display of said plurality of images;
(c) selecting a predetermined number of said plurality of images, including a sequence thereof, from among said plurality of images presented in said display;
(d determining said selected images together with said sequence; and
(e) generating an image for a printer by splitting each of said determined images into predetermined regions and by arranging said regions in an order corresponding to said sequence of said plurality of images.

49. An image data generation method for use with a plurality of images comprising the steps of:
(a) inputting said plurality of images;
(b) providing a predetermined interval at which intermediate transforming images are generated;
(c) generating a predetermined number of intermediate transforming images transitioning between said input images based on said plurality of input images and said predetermined interval; and
generating an image for printing by splitting at least a portion of each of said plurality of input images and said intermediate transforming images into predetermined regions and by arranging the same in a prescribed order corresponding to the sequence of said plurality of input images and said generated transforming image transitions.

50. An image data generating apparatus for use with a plurality of images comprising:
image input means for inputting said plurality of images;
position aligning means for aligning, to a position of a predetermined image portion of one image selected from among said plurality of input images, the position of an image portion in each of the remaining plurality of input images corresponding to said predetermined image portion; and
image data format converting means for generating an image for a printer by splitting each of the aligned images into predetermined regions and by arranging the regions in a prescribed order.

51. An image data generating apparatus for use with a plurality of images comprising:
image input means for inputting said plurality of images;
position aligning means for aligning, to a position of a predetermined image portion of one image selected from among said plurality of input images, the position of an image portion in each of the remaining plurality of input images corresponding to said predetermined image portion;
image transformation processing means for generating a plurality of intermediate transforming images transitioning between said aligned images based on said plurality of aligned images;

image data format converting means for generating an image for printing by splitting at least a portion of at least one of said plurality of aligned images and said transforming images into predetermined regions and by arranging the same in a prescribed order corresponding to the sequence of said plurality of aligned images and said intermediate transforming images; and image printing means for printing the image for printing.

52. An image data generating apparatus for use with a plurality of images comprising:

image input means for inputting said plurality of images;

selecting means for selecting a predetermined number of images, including a sequence thereof, from among said input images;

sequencing information appending means for appending at least one of i) numerals, ii) symbols, and ii) images, indicating the sequence of the images selected and determined by said selection means, to each of said selected images; and image data format converting means for generating an image for a printer by splitting at least a portion of at least one of the images from said sequencing information appending means into predetermined regions and by arranging the same in a prescribed order corresponding to said sequence.

53. An image data generation method for use with a plurality of images comprising the steps of:

(a) inputting said plurality of images;

(b) aligning, to a position of a predetermined portion of one image selected from among said plurality of input images, the position of an image portion in each of the remaining input images corresponding to said predetermined image portion; and (c) generating an image for a printer by splitting each of the aligned images into predetermined regions and by arranging the same in a prescribed order.

54. An image data generation method for use with a plurality of images comprising the steps of:

(a) inputting said plurality of images;

(b) aligning, to a position of a predetermined portion of one image selected from among said plurality of input images, the position of an image portion in each of the remaining input images corresponding to said predetermined image portion;

(c) generating a plurality of intermediate transforming images transitioning between said aligned images based on said plurality of aligned images; and (d) generating an image for printing by splitting each of all or part of said plurality of aligned images and said generated transforming images into predetermined regions and by arranging the same in a prescribed order corresponding to the sequence of said plurality of aligned images and said transforming image transitions.

55. An image data generation method for use with a plurality of images comprising the steps of:

(a) inputting said plurality of images;

(b) selecting a predetermined number of said plurality of images, including a sequence thereof, from among said plurality of images;

(c) appending at least one of i) numerals, ii) symbols, and iii) images, indicating the sequence of said selected and determined images, to each of said selected images; and (d) generating an image for a printer by splitting each of the images with said numerals or symbols or images indicating the sequence thereof appended thereto into predetermined regions and by arranging the same in a prescribed order corresponding to said sequence.

56. An image recording method for use with a lenticular sheet, comprising the steps of:

(a) drawing a first image on a surface of said lenticular sheet;

(b) forming a layer on said drawn image; and (c) drawing a further image over the layer formed in step (b).

57. A method for recording on a lenticular sheet comprising the steps of:

(a) drawing a picture on the lenticular sheet;

(b) forming a white layer on an ink sheet base; and (c) transferring the white layer to the picture drawn on the lenticular sheet by using a thermal head.

58. An image recording method comprising the steps of:

(a) positioning and supporting a lenticular sheet in a prescribed direction and in a prescribed position on a lenticular sheet supporting member;

(b) recording an image on a surface of said lenticular sheet by moving said lenticular sheet and an image recording means relative to each other; and (c) forming an adhesion layer on said recorded surface directly or with a white layer interposed therebetween.

59. A recording method according to claim 57, wherein said lenticular sheet contains at least a vinyl chloride resin, and said white layer contains at least a copolymer resin of a vinyl chloride resin and a vinyl acetate resin and a titanium oxide.

* * * * *